(12) United States Patent
Nixon

(10) Patent No.: US 11,949,450 B1
(45) Date of Patent: Apr. 2, 2024

(54) SYSTEMS, APPARATUS, ARTICLES OF MANUFACTURE, AND METHODS FOR CODE MERGING IN COMMUNICATION SYSTEMS

(71) Applicant: The Boeing Company, Arlington, VA (US)

(72) Inventor: Leslie Alexander Nixon, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/944,749

(22) Filed: Sep. 14, 2022

(51) Int. Cl.
*H04B 10/112* (2013.01)

(52) U.S. Cl.
CPC .................................. *H04B 10/112* (2013.01)

(58) Field of Classification Search
CPC .................................................... H04B 10/112
USPC .......................................................... 398/118
See application file for complete search history.

(56) References Cited

U.S. PATENT DOCUMENTS

| | | | | |
|---|---|---|---|---|
| 7,308,207 B2 * | 12/2007 | Chen | ....................... | G01S 7/481 398/118 |
| 7,831,150 B2 * | 11/2010 | Roes | ..................... | H04L 9/3231 398/118 |
| 8,325,081 B2 * | 12/2012 | Rivers | ................... | G01S 13/781 342/148 |
| 2009/0074422 A1 * | 3/2009 | Stewart | ................... | G01S 17/74 398/118 |
| 2015/0256255 A1 * | 9/2015 | Stewart | .............. | H04B 10/1123 398/128 |
| 2017/0011634 A1 * | 1/2017 | Ringlen | ............... | G08G 5/0026 |

* cited by examiner

*Primary Examiner* — Dalzid E Singh
(74) *Attorney, Agent, or Firm* — Hanley, Flight & Zimmerman, LLC

(57) ABSTRACT

Systems, apparatus, methods, and articles of manufacture are disclosed for code merging in communication systems. An example apparatus includes at least one memory, machine-readable instructions, and processor circuitry to at least one of instantiate or execute the machine-readable instructions to at least identify first data as line-of-sight data based on a first range of a first target object, identify second data as multipath data based on a second range of a second target object, after a determination that the second data includes a data portion not included in the first data, output communication data based on a merge of the first data and the second data, and cause movement of at least one of the first target object or the second target object based on the communication data.

20 Claims, 17 Drawing Sheets

SYSTEMS, APPARATUS, ARTICLES OF MANUFACTURE, AND METHODS FOR CODE MERGING IN COMMUNICATION SYSTEMS

FIELD OF THE DISCLOSURE

This disclosure relates generally to communication systems and, more particularly, to systems, apparatus, articles of manufacture, and methods for code merging in communication systems.

BACKGROUND

Vehicles, such as aircraft, may utilize electromagnetic-frequency-based communication systems for various functions including collision avoidance, transmission of vehicle data (e.g., altitude, bearing, speed, etc.), and voice communication. In some instances, vehicles may utilize electromagnetic-frequency-based communications to implement an identification system based on identification friend or foe (IFF) techniques. Civilian and non-civilian (e.g., military) air traffic control systems may utilize IFF techniques to obtain vehicle identification information, identify vehicles as authorized and/or friendly, and to determine their bearing and range. Due to physical and/or technical constraints, some received electromagnetic-frequency-based communications may be incomplete.

SUMMARY

Figure 1:
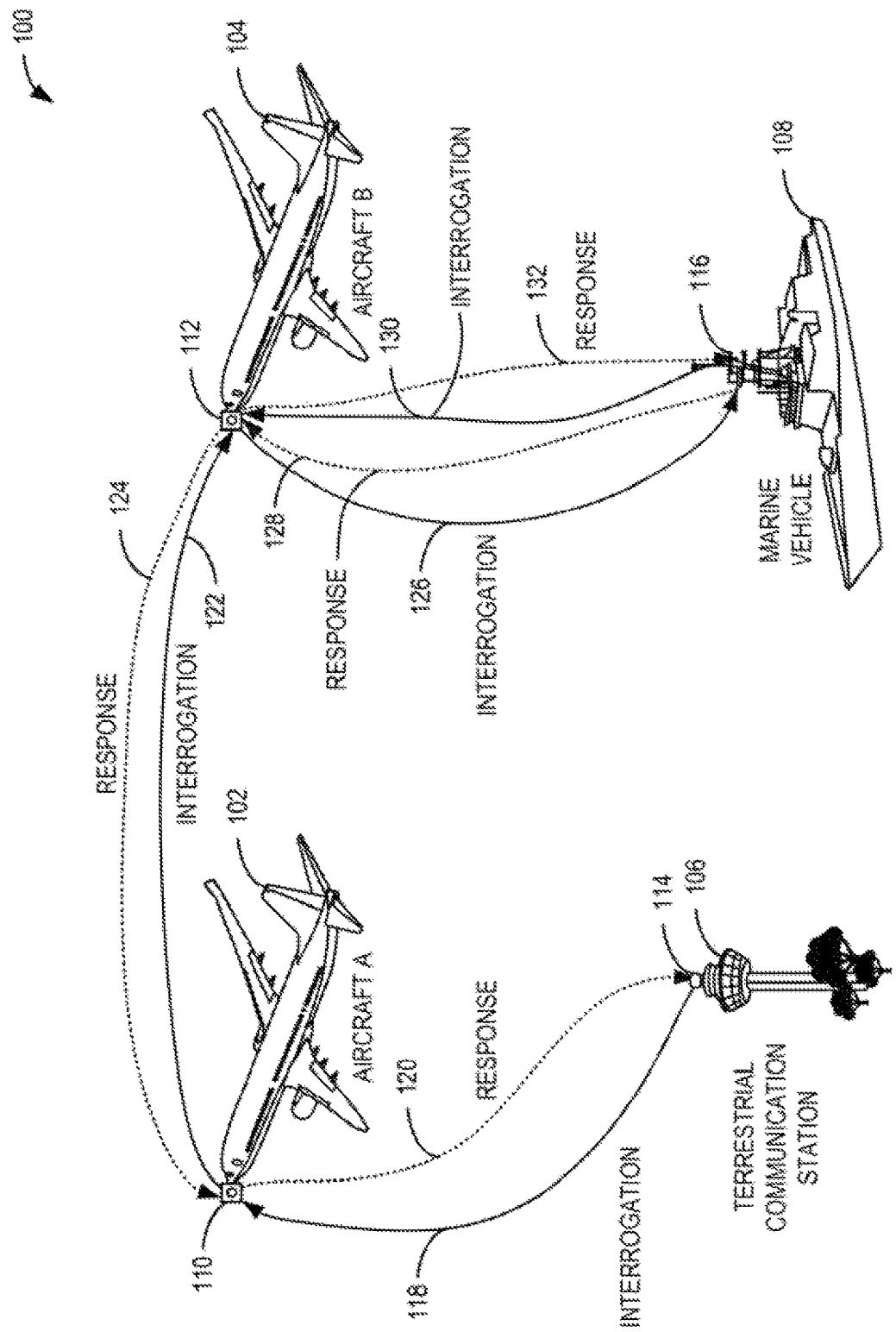
FIG. 1 is an illustration of an example communication system including a first example aircraft, a second example aircraft, an example terrestrial communication station, and an example marine vehicle.

Example systems, apparatus, articles of manufacture, and methods for code merging in communication systems are disclosed herein.

An example apparatus includes at least one memory, machine-readable instructions, and processor circuitry to at least one of instantiate or execute the machine-readable instructions to at least identify first data as line-of-sight data based on a first range of a first target object, identify second data as multipath data based on a second range of a second target object, after a determination that the second data includes a data portion not included in the first data, output communication data based on a merge of the first data and the second data, and cause movement of at least one of the first target object or the second target object based on the communication data.

An example non-transitory machine-readable storage medium includes instructions that, when executed, cause processor circuitry to at least identify first data as line-of-sight data based on a first range of a first target object, identify second data as multipath data based on a second range of a second target object, after a determination that the second data includes a data portion not included in the first data, generate communication data based on a combination of the first data and the second data, and cause movement of at least one of the first target object or the second target object based on the communication data.

An example method includes identifying first data as line-of-sight data based on a first range of a first target object, identifying second data as multipath data based on a second range of a second target object, after a determination that the second data includes a data portion not included in the first data, outputting communication data based on a merge of the first data and the second data, and causing movement of at least one of the first target object or the second target object based on the communication data.

DETAILED DESCRIPTION

In general, the same reference numbers will be used throughout the drawing(s) and accompanying written description to refer to the same or like parts. The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" and "substantially real-time" refer to occurrence in a near instantaneous manner recognizing there may be real-world delays for computing time, transmission, etc. Thus, unless otherwise specified, "substantially real time" and "substantially real-time" refer to being within a 1-second time frame of real time.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Aerial vehicles encompass a variety of different type of aircraft such as commercial aircraft, civilian and non-civilian aircraft, utility aircraft, and unmanned aerial vehicles (UAVs) (e.g., drones). Aerial vehicles can include electromagnetic (e.g., electromagnetic based) transmitters and/or receivers (e.g., infrared detectors, radios, radar systems, transceivers, etc.) to facilitate communication between (i) the aerial vehicles and (ii) terrestrial or ground-based communication stations, land vehicles or land-based vehicles, marine-based vehicles, and/or other aircraft. Electromagnetic-based communication may be used to transmit data from an origin (e.g., a source) to a destination (e.g., a target). Transmitted data can include identification information (e.g., an aircraft tail number, an identifier associated with a communication device, a vehicle identification number (VIN), etc.), data representative of an identification of whether a vehicle is friendly (i.e., a friend), neutral, or adversarial (i.e., a foe), and/or voice communication (e.g., a pilot of an aircraft audibly communicating with an air traffic controller).

In some instances, electromagnetic-based communication between vehicles (e.g., aerial vehicles, land-based vehicles, marine-based vehicles, etc.) or between a vehicle and a terrestrial communication station (e.g., a ground station, an Earth station, an Earth terminal, etc.) may be implemented at least in part by an interrogation communication technique such as an identification friend or foe technique (IFF technique). An IFF system is an identification system for command, control, and/or data sharing associated with a vehicle (e.g., an aerial vehicle, a land vehicle or land-based vehicle, a marine-based vehicle, etc.). Typically, IFF systems use radar frequencies, but any other electromagnetic frequencies such as infrared or other radio portions of the electromagnetic spectrum may be used.

An example IFF system can include an interrogator (e.g., an interrogator device, an interrogator interface, interrogator interface circuitry, etc.) and a transponder. In some examples, the interrogator can be implemented by an electromagnetic transmitter, receiver, and/or transceiver. In some examples, the interrogator is a device, interface, and/or interface circuitry that can be implemented by interface hardware (e.g., interface circuitry), software, and/or firmware that can transmit an electromagnetic signal (e.g., a radar signal, a radio signal, etc.) to a transponder and receive an electromagnetic signal from the transponder.

In some examples, the transponder can be implemented by an electromagnetic transmitter, receiver, and/or transceiver. In some examples, the transponder is a device, interface, and/or interface circuitry that can be implemented by interface hardware (e.g., interface circuitry), software, and/or firmware that can receive an electromagnetic signal (e.g., a radar signal, a radio signal, etc.) and transmit (e.g., automatically transmit, involuntarily transmit, etc.) a different electromagnetic signal in response to the received electromagnetic signal.

IFF systems are two-channel systems that use a first frequency (e.g., 1030 megahertz (MHz)) for interrogating signals (e.g., transmission of interrogating signals) and a second frequency (e.g., 1090 MHz) for reply or response signals (e.g., transmission of reply or response signals). IFF systems are typically divided into various modes (e.g., IFF modes, communication modes, etc.), which can include Mode 1, Mode 2, Mode 3/Mode A (commonly referred to as "Mode 3/A"), Mode 3/Mode C (commonly referred to as "Mode 3/C" or simply "Mode C"), Mode 4, Mode 5, and/or Mode S. Alternatively, an IFF system may include a different number and/or type of modes. Typically, Modes 1, 2, 3, 4, and 5 are reserved for non-civilian (e.g., military) use. Modes A and C are typically reserved for civilian use. Mode S can be reserved for non-civilian and/or civilian use.

In some examples, Mode C is an altitude reporting mode, which can be used to report and/or otherwise return a current altitude of a vehicle to an interrogator or requestor. Mode 3/A is the conventional or standard air traffic control mode.

For example, Mode 3/A can be used with the altitude reporting mode (Mode C) to provide identification and control of aircraft flying under instrument flight rules. By way of example, ground interrogators managed and/or controlled by the Federal Aviation Administration (FAA) of the United States Government can interlace modes by alternately sending communications based on Mode 3/A and Mode C to an aircraft to receive continuous identification and altitude data from the aircraft.

In some examples, the interrogator and/or transponder can be airborne, such as by being included in and/or otherwise associated with an aerial vehicle. In some examples, the interrogator and/or transponder can be terrestrial, ground based, and/or fixed, such as by being included in and/or otherwise associated with a terrestrial communication station (e.g., an air traffic control tower or structure, a communication dish, a radar tower, etc.). In some examples, the interrogator and/or transponder can be mobile or portable, such as by being included in and/or otherwise associated with a land-based vehicle (e.g., an automobile, a bus, a train, a truck, etc.) and/or marine-based vehicle (e.g., a boat, a ship, etc.).

In some examples, an interrogator can transmit a coded interrogation burst (e.g., electromagnetic signal(s) representative of one or more communication or data codes) via a directional antenna to cause a transponder of a target (e.g., a target object, a target vehicle, etc.) to respond or reply with data (e.g., identification information, vehicle data such as altitude, etc.) based on a type of the interrogation. For example, the transponder can encode data representative of an aircraft tail number, an altitude, a position, or any other vehicle-related data associated with the transponder in the coded interrogation burst.

In some examples, the interrogator can determine a bearing and/or a range of the target based on measurements associated with an antenna or other interface circuitry that received the response from the target. For example, the interrogator can determine a bearing of the target based on a direction (e.g., an azimuth direction) in which the antenna is pointed. In some examples, the interrogator can determine a range of the target based on a difference between a first time at which a transmission is sent to a target and a second time at which a reply is received from the target.

In some examples, IFF systems experience multipath propagation phenomena. For example, an interrogator of an IFF system can transmit a coded interrogation burst to an intended target, such as a commercial aircraft. In some examples, the interrogator receives first data at a first time and second data at a second time. The interrogator can determine that the first data is associated with a first range and the second data is associated with a second range. The interrogator can determine that the first range and the second range implicate the existence of different aircraft because the first data and the second data have different ranges (or distances) associated with them that are outside of a predefined threshold.

In some examples, the interrogator can determine that the first data and the second data originate from the same source (e.g., the same target, the same target object, etc.), such as the intended target. For example, the interrogator can receive the first data before the second data due to the first data being directly transmitted from a target to the interrogator without bounces (e.g., bouncing of an electromagnetic signal off the Earth, a building, another aircraft, etc.) or interferences (e.g., physical or electromagnetic interferences) and the second data being indirectly transmitted from the target to the interrogator with bounces and/or interferences. As used herein, data that is transmitted via electromagnetic signal(s) without bounce(s) or interference(s) is referred to as "line-of-sight (LOS) data." As used herein, data that is transmitted via electromagnetic signal(s) with bounce(s) and/or interference(s) is referred to as "multipath data."

In some examples, an interrogator of an IFF system prioritizes LOS data over multipath data based on data integrity considerations. In some examples, an interrogator can receive data from a target that is missing one or more data portions, such as data codes. For example, an interrogator can receive data that includes a first data code on Mode 1 but not a second data code on Mode 2. In some examples, the interrogator can discard (or reject) the data because of the missing second data code or output incomplete communication data to another system, such as a tracking system (e.g., an object or vehicle tracking system), an identification system (e.g., an object or vehicle identification system), etc. In some examples, discarded or incomplete communication data can cause ambiguities in the control and/or control outputs of other system(s) and/or suboptimal operation of the other system(s) and/or associated operator(s) (e.g., human operator(s)) of the other system(s).

Systems, apparatus, articles of manufacture, and methods for code merging in communication systems are disclosed herein. In some disclosed examples, an interrogator of a communication system, such as an IFF system, can add or supplement missing data code(s) in LOS data from previously unwanted data sources such as multipath data sources. For example, conventional IFF systems can discard and/or otherwise reject the use of data codes from multipath data sources. Advantageously, examples disclosed herein can identify data code(s) in LOS data; identify data code(s) in multipath data that is/are not included in the LOS data; and generate and/or otherwise output complete communication data based on the data code(s) from the LOS data and/or the data code(s) from the multipath data. Advantageously, examples disclosed herein can generate and/or otherwise output complete communication data to cause improvements of operation of identification and/or control systems associated with vehicles (e.g., aerial vehicles, land-based vehicles, marine-based vehicles, etc.) for enhanced safety, efficiency, and/or operation of the vehicles.

Turning to the figures, FIG. 1 is an illustration of a first example communication system 100, which includes a first example aircraft 102 (identified by AIRCRAFT A), a second example aircraft 104 (identified by AIRCRAFT B), an example terrestrial communication station 106, and an example marine vehicle 108. In example operation, the first aircraft 102, the second aircraft 104, the terrestrial communication station 106, and the marine vehicle 108 can be in communication with one(s) of each other via communication protocol(s) (e.g., a radar communication protocol, a radio communication protocol, etc.) that can be implemented by electromagnetic-based communication. For example, the first aircraft 102, the second aircraft 104, the terrestrial communication station 106, and the marine vehicle 108 can be in communication with one(s) of each other via communication protocol(s) that utilize(s) frequencies in the Ultra High Frequency (UHF) band (e.g., a frequency range of 300 MHz to 3 GHz or any other frequency range), the Very High Frequency (VHF) band (e.g., a frequency range of 30 to 300 MHz or any other frequency range), the L-Band (e.g., a frequency range of 1 Gigahertz (GHz) to 2 GHz or any other frequency range), the S-Band (e.g., a frequency range of 2 GHz to 4 GHz or any other frequency range), the C-Band (e.g., a frequency range of 4 GHz to 8 GHz or any other frequency range), the Ka-Band, or the Ku-Band of the electromagnetic spectrum.

In some examples, the first aircraft 102, the second aircraft 104, the terrestrial communication station 106, and the marine vehicle 108 can be in communication with one(s) of each other via communication protocol(s) such as a communication protocol provided by FreeWave Technologies, Inc. (e.g., a FreeWave communication protocol, a radio that communicates using a FreeWave communication protocol, etc.), a communication protocol supported by a BANDIT™ radio (e.g., a BANDIT™ radio that supports L-, S-, and/or C-Band communication), a communication protocol based on an Enhanced Position Location Reporting System (EPLRS) network, a Wave Relay® mobile ad hoc network (MANET) communication protocol or network, a satellite communication (SATCOM) protocol based on L-, S-, C-Band, etc., electromagnetic frequencies, a satellite-based optical datalink, etc.

In the illustrated example, the first aircraft 102 and the second aircraft 104 are commercial aircraft. Alternatively, the first aircraft 102 and/or the second aircraft 104 may be any other type of aerial vehicle, such as an unmanned aerial vehicle (UAV) (e.g., a drone, an autonomous UAV, etc.), a rotorcraft (e.g., a helicopter), etc. In this example, the first aircraft 102 and the second aircraft 104 are fixed-wing aircraft. Alternatively, the first aircraft 102 and/or the second aircraft 104 may be non-fixed wing aircraft such as a rotorcraft.

In the illustrated example, the terrestrial communication station 106 is an air traffic control tower. Alternatively, the terrestrial communication station 106 may be any other type building, structure, etc. associated with a communication system. In the illustrated example, the marine vehicle 108 is a ship associated with a communication system. Alternatively, the marine vehicle 108 may be any other type of watercraft such as a manned or unmanned boat, buoy, submarine, vessel, etc. The first communication system 100 of FIG. 1 may include a different quantity of vehicles and/or any other type of vehicle such as a ground or land-based vehicle (e.g., a manned or unmanned bus, car, train, truck, etc.), non-terrestrial craft (e.g., a satellite such as a low-Earth orbit (LEO) satellite, a manned or unmanned spacecraft, etc.), etc., and/or combination(s) thereof.

In the illustrated example, the first aircraft 102, the second aircraft 104, the terrestrial communication station 106, and the marine vehicle 108 respectively include example radios 110, 112, 114, 116. For example, the first aircraft 102 includes a first example radio 110, the second aircraft 104 includes a second example radio 112, the terrestrial communication station 106 includes a third example radio 114, and the marine vehicle 108 includes a fourth example radio 116.

In some examples, the radios 110, 112, 114, 116 respectively include a transmitter (e.g., a radio transmitter, an antenna, etc.), a receiver (e.g., a radio receiver, an antenna, etc.), and/or a transceiver (e.g., a radio transceiver, an antenna, etc.) and/or associated circuitry (e.g., control circuitry, a power supply, an amplifier, a modulator, a demodulator, etc.). For example, one(s) of the radios 110, 112, 114, 116 can be implemented by one or more application processors (e.g., a radio application processor), radio circuitry, baseband processing circuitry (e.g., analog-to-digital converters (ADCs), digital-to-analog converters (DACs), etc.), synthesizers (e.g., synthesizer circuitry), filters (e.g., filter circuitry), etc.

In some examples, the first radio 110, the second radio 112, the third radio 114, and/or the fourth radio 116 include a transponder and/or is/are implemented by a transponder. In some examples, the first radio 110, the second radio 112, the third radio 114, and/or the fourth radio 116 include or is/are coupled to one or more directional antennas. For example, the first radio 110, the second radio 112, the third radio 114, and/or the fourth radio 116 can be in communication with one or more respective directional antennas through front-end module circuitry (e.g., a transmit switch, a receive switch, a transmit and receive switch, one or more duplexers, one or more filters, one or more amplifiers, etc.).

In some examples, the first radio 110, the second radio 112, the third radio 114, and/or the fourth radio 116 include or is/are coupled to one or more omnidirectional (i.e., omni) antennas. For example, the first radio 110, the second radio 112, the third radio 114, and/or the fourth radio 116 can be in communication with one or more respective omnidirectional antennas through front-end module circuitry (e.g., a transmit switch, a receive switch, a transmit and receive switch, one or more duplexers, one or more filters, one or more amplifiers, etc.). For example, an omnidirectional antenna can be implemented by an antenna that radiates equal or substantially equal (e.g., within a tolerance range of +/−0.1%, 0.5%, 1.0%, 2%, etc.) radio power in all directions perpendicular to an axis, with power varying with angle to the axis, and declining to zero on the axis. Additionally or alternatively, the first radio 110, the second radio 112, the third radio 114, and/or the fourth radio 116 can include and/or be coupled to one or more different types of antennas for radio communication.

In some examples, the radios 110, 112, 114, 116 can include one or more actuators (e.g., pan actuators, tilt actuators, pan-tilt actuators, etc.) on which a radio and/or an antenna can be coupled. For example, the first radio 110 can include one or more actuators coupled to the first radio 110 to cause an adjustment or change in position or orientation of antenna(e) of the first radio 110.

In some examples, the first aircraft 102, the second aircraft 104, the terrestrial communication station 106, and/or the marine vehicle 108 can communication with one(s) of each other using an interrogation-based communication schema or technique, such as an identification friend or foe (IFF) schema or technique. By way of example, the third radio 114 of the terrestrial communication station 106 can transmit a first example interrogation message 118 to the first radio 110 of the first aircraft 102. For example, the first interrogation message 118 can be implemented by one or more electromagnetic signals (e.g., radar signals, radio signals, etc.). In some examples, the third radio 114 of the terrestrial communication station 106 can generate the first interrogation message 118 to request a target vehicle, such as the first aircraft 102, for identification information and/or vehicle data associated with the first aircraft 102. For example, the third radio 114 of the terrestrial communication station 106 can generate the first interrogation message 118 as a first signal in IFF Mode 3/A to request an identification code (e.g., a 4-digit octal identification code) for the first aircraft 102 and/or a second signal in IFF Mode C to request an altitude (e.g., an aircraft pressure altitude) of the first aircraft 102.

In example operation, in response to receiving the first interrogation message 118, the first radio 110 transmits a first example response message 120. For example, the first response message 120 can be implemented by one or more electromagnetic signals (e.g., radar signals, radio signals, etc.). The first radio 110 can generate the first response message 120 to return and/or otherwise output to the terrestrial communication station 106 (i) the identification code of the first aircraft 102 and/or (ii) the altitude of the first aircraft 102. In example operation, the terrestrial communication station 106 can receive the identification code and/or the altitude from the first aircraft 102; generate a report (e.g., an air traffic report, an air traffic control report, an air traffic management report, a data report, etc.) that includes the identification code and/or the altitude; and output the report to a different computing or electronic system, such as a tracking system (e.g., an object or vehicle tracking system), an identification system (e.g., an object or vehicle identification system), etc. For example, the tracking system can instruct the second aircraft 104 to change an altitude, a bearing, an air speed, etc., of the second aircraft 104 based on the identification code and/or the altitude of the first aircraft 102.

By way of another example, the first radio 110 of the first aircraft 102 can transmit a second example interrogation message 122 to the second radio 112 of the second aircraft 104. For example, the second interrogation message 122 can be implemented by one or more electromagnetic signals (e.g., radar signals, radio signals, etc.). In some examples, the first radio 110 of the first aircraft 102 can generate the second interrogation message 122 to request a target vehicle, such as the second aircraft 104, for identification information and/or vehicle data associated with the second aircraft 104. For example, the first radio 110 of the first aircraft 102 can generate the second interrogation message 122 as a first signal in IFF Mode 3/A to request an identification code (e.g., a 4-digit octal identification code) for the second aircraft 104 and/or a second signal in IFF Mode C to request an altitude (e.g., an aircraft pressure altitude) of the second aircraft 104.

In example operation, in response to receiving the second interrogation message 122, the second radio 112 transmits a second example response message 124. For example, the second response message 124 can be implemented by one or more electromagnetic signals (e.g., radar signals, radio signals, etc.). The second radio 112 can generate the second response message 124 to return and/or otherwise output to the first aircraft 102 (i) the identification code of the second aircraft 104 and/or (ii) the altitude of the second aircraft 104. In example operation, the first aircraft 102 can receive the identification code and/or the altitude from the second aircraft 104; generate a report (e.g., an air traffic report, an air traffic control report, a data report, etc.) that includes the identification code and/or the altitude; and output the report to a different computing or electronic system, such as a tracking system, an identification system, etc. In some examples, the tracking system, the identification system, etc., is/are included in the first aircraft 102. For example, the tracking system of the first aircraft 102 can instruct a flight control computer (FCC) of the first aircraft 102 to change an altitude, a bearing, an air speed, etc., of the first aircraft 102 based on the identification code and/or the altitude of the second aircraft 104.

By way of yet another example, the second radio 112 of the second aircraft 104 can transmit a third example interrogation message 126 to the fourth radio 116 of the marine vehicle 108. For example, the third interrogation message 126 can be implemented by one or more electromagnetic signals (e.g., radar signals, radio signals, etc.). In some examples, the second radio 112 of the second aircraft 104 can generate the third interrogation message 126 to request a target vehicle, such as the marine vehicle 108, for identification information and/or vehicle data associated with the marine vehicle 108. For example, the second radio 112 of the second aircraft 104 can generate the third interrogation message 126 as a first signal in IFF Mode 3/A to request an identification code (e.g., a 4-digit octal identification code) for the marine vehicle 108 and/or a second signal in IFF Mode C to request an altitude (e.g., an aircraft pressure altitude) of the marine vehicle 108.

In example operation, in response to receiving the third interrogation message 126, the fourth radio 116 transmits a third example response message 128. For example, the third response message 128 can be implemented by one or more electromagnetic signals (e.g., radar signals, radio signals, etc.). The fourth radio 116 can generate the third response message 128 to return and/or otherwise output to the second aircraft 104 (i) the identification code of the marine vehicle 108 and/or (ii) the altitude of the marine vehicle 108. In example operation, the second aircraft 104 can receive the identification code and/or the altitude from the marine vehicle 108; generate a report (e.g., an air traffic report, an air traffic control report, a data report, etc.) that includes the identification code and/or the altitude; and output the report to a different computing or electronic system, such as a tracking system, an identification system, etc. In some examples, the tracking system, the identification system, etc., is/are included in the second aircraft 104. For example, the tracking system of the second aircraft 104 can instruct an FCC of the second aircraft 104 to change an altitude, a bearing, an air speed, etc., of the second aircraft 104 based on the identification code and/or the altitude of the marine vehicle 108.

By way of yet another example, the fourth radio 116 of the marine vehicle 108 can transmit a fourth example interrogation message 130 to the second radio 112 of the second aircraft 104. For example, the fourth interrogation message 130 can be implemented by one or more electromagnetic signals (e.g., radar signals, radio signals, etc.). In some examples, the fourth radio 116 of the marine vehicle 108 can generate the fourth interrogation message 130 to request a target vehicle, such as the second aircraft 104, for identification information and/or vehicle data associated with the second aircraft 104. For example, the fourth radio 116 of the marine vehicle 108 can generate the fourth interrogation message 130 as a first signal in IFF Mode 3/A to request an identification code (e.g., a 4-digit octal identification code) for the second aircraft 104 and/or a second signal in IFF Mode C to request an altitude (e.g., an aircraft pressure altitude) of the second aircraft 104.

In example operation, in response to receiving the fourth interrogation message 130, the second radio 112 transmits a fourth example response message 132. For example, the fourth response message 132 can be implemented by one or more electromagnetic signals (e.g., radar signals, radio signals, etc.). The second radio 112 can generate the fourth response message 132 to return and/or otherwise output to the marine vehicle 108 (i) the identification code of the second aircraft 104 and/or (ii) the altitude of the second aircraft 104. In example operation, the marine vehicle 108 can receive the identification code and/or the altitude from the second aircraft 104; generate a report (e.g., an air traffic report, an air traffic control report, a data report, etc.) that includes the identification code and/or the altitude; and output the report to a different computing or electronic system, such as a tracking system, an identification system, etc. In some examples, the tracking system, the identification system, etc., is/are included in the marine vehicle 108. For example, the tracking system of the marine vehicle 108 can instruct an FCC of the second aircraft 104 to change an altitude, a bearing, an air speed, etc., of the second aircraft 104 based on the identification code and/or the altitude of the second aircraft 104. In some examples, the tracking system of the marine vehicle 108 can instruct a ship control computer of the marine vehicle 108 to change a bearing, a nautical speed, etc., of the marine vehicle 108 based on the identification code and/or the altitude of the second aircraft 104. Any other examples of IFF based on the first communication system 100 of FIG. 1, such as communication(s) (e.g., IFF communication(s)) between the terrestrial communication station 106 and the second aircraft 104, are contemplated.

Figure 2:
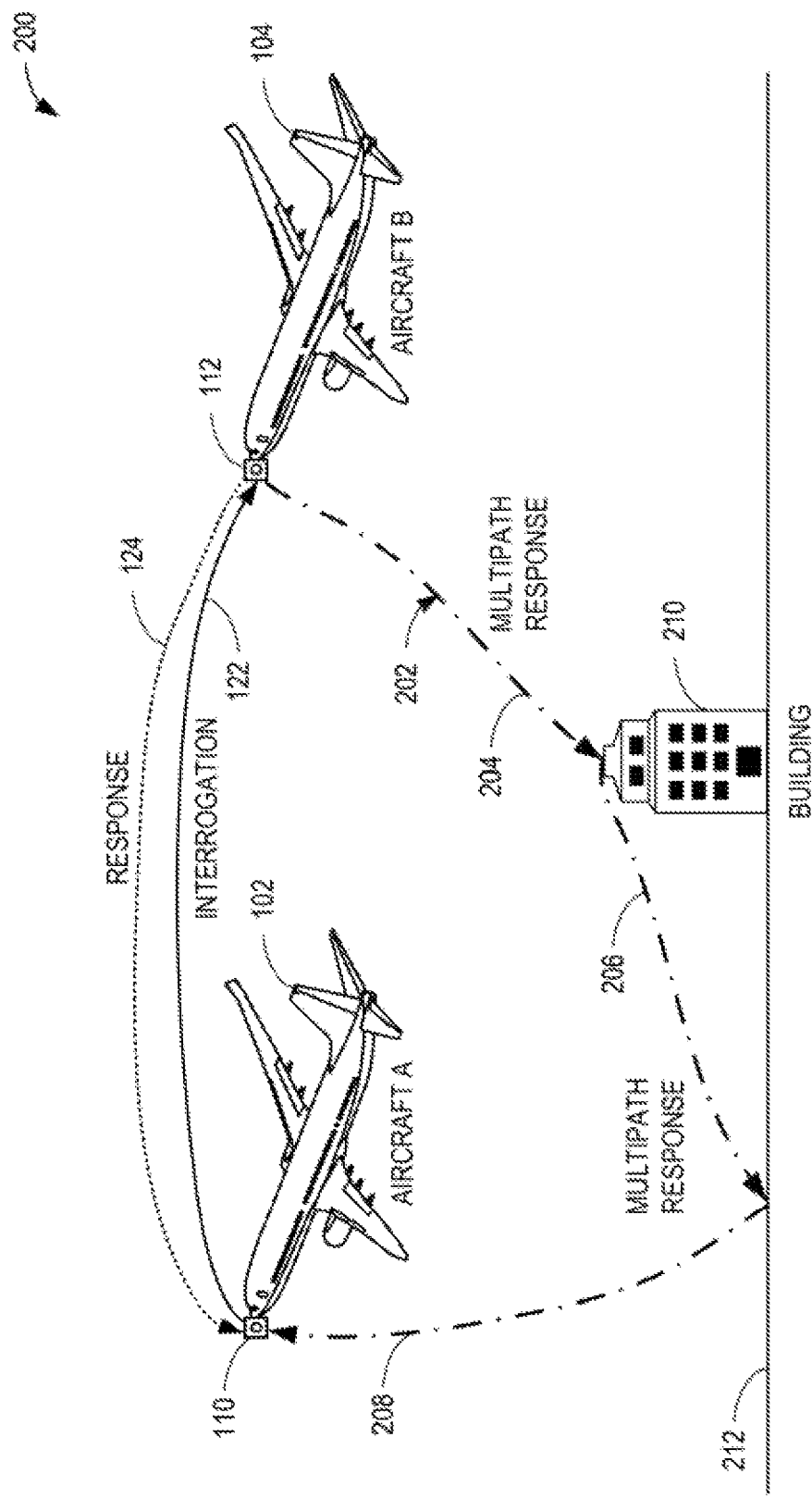
FIG. 2 is an illustration of the first example aircraft and the second example aircraft of FIG. 1 associated with multipath communication.

FIG. 2 is an illustration of a second example communication system 200, which includes the first aircraft 102, the second aircraft 104, the first radio 110, the second radio 112, the second interrogation message 122, and the second response message 124 of FIG. 1. The second communication system 200 of FIG. 2 illustrates a propagation phenomenon known as multipath propagation that can occur in connection with wireless communication (e.g., radio communication). Multipath propagation is the propagation phenomenon that can result in radio signals reaching a receiving antenna by way of two or more paths. Example causes of multipath include atmospheric ducting, ionospheric reflection and refraction, and reflection from water of bodies and terrestrial objects such as buildings and mountains. For example, when the same radio signal is received over more than one path, it can create interference and phase shifting of the signal. In some examples, destructive interference can cause fading, which can cause a radio signal to have reduced signal strength in certain areas of the radio signal to be received adequately.

In the illustrated example of FIG. 2, the first radio 110 of the first aircraft 102 transmits the second interrogation message 122 to an intended target vehicle, such as the second aircraft 104. In response to receiving the second interrogation message 122 via the second radio 112, the second aircraft 104 transmits the second response message 124 and a fifth example response message 202 (identified by MULTIPATH RESPONSE). The second response message 124 of the illustrated example is a line-of-sight (LOS) response message because the second response message 124 is transmitted and received without bounces, interferences, etc., from origin (e.g., the second radio 112) to destination (e.g., the first radio 110). The fifth response message 202 is a multipath response message because the fifth response message 202 is transmitted and received with one or more bounces, interferences, etc., which results in two or more paths (e.g., communication paths, data paths, radio paths, wireless communication paths, etc.).

The fifth response message 202 of the illustrated example of FIG. 2 has three example paths 204, 206, 208 including a first example path 204, a second example path 206, and a third example path 208. The first path 204 is from the second radio 112 to an example building 210. Alternatively, the first path 204 may be from the second radio 112 to any other object (e.g., a land-based vehicle, a road, a highway, a bridge, etc.), aspect of nature (e.g., a body of water, a mountain, etc.), etc. The second path 206 is from the building 210 to an example ground surface 212. For example, the ground surface 212 can be the Earth, a road, a highway, a sidewalk, etc. The third path 208 is from the ground surface 212 to the first radio 110 of the first aircraft 102.

In some examples, the second radio 112 can transmit the second response message 124 to be representative of a plurality of data codes, such as a first data code and a second data code. For example, the first data code can be representative of an identifier or identification of the second aircraft 104. In some examples, the second data code can be representative of an altitude of the second aircraft 104.

In some examples, the first radio 110 can receive the second response message 124 and identify the first data code and the second data code. In such examples, the first radio 110 can determine that a complete response has been received in response to transmission of the second interrogation message 122.

In some examples, the first radio 110 can receive the second response message 124 and identify the first data code but not the second data code (or identify the second data code and not the first data code). In such examples, the first radio 110 can determine that an incomplete response has been received in response to transmission of the second interrogation message 122. For example, the first radio 110 can receive an incomplete response due to physical constraints of at least one of the first radio 110 or the second radio 112. An example physical constraint can be that a directional antenna of the first radio 110 is pointed in a different direction than a direction of the second aircraft 104 at the time of transmission of the second response message 124. Another example physical constraint can be that the first radio 110 has a duty cycle in which it is non-operational during a time period in which the second response message 124 (or portion(s) of the second response message 124) is to be received. In some examples, the first aircraft 102 may be sub-optimally controlled due to the incomplete response.

Advantageously, examples disclosed herein can overcome difficulties associated with receiving incomplete responses to interrogation messages or requests. In some examples, after a determination that the second response message 124 is missing one or more data codes and/or otherwise is incomplete, the first radio 110, and/or, more generally, the first aircraft 102, can add the one or more missing data codes from another data source, such as the data code(s) of the fifth response message 202. For example, the first radio 110 can determine that the second response message 124 is missing the first data code; determine that the fifth response message 202 includes the missing first data code; output a report that includes the missing data code; and cause the first aircraft 102 to perform an operation (e.g., change an altitude, change a bearing, remain on a bearing, etc.) based on the report. Advantageously, examples disclosed herein can merge data from different data sources, such as a LOS response message and a multipath response message, to provide a system (e.g., a computing system, an electronic system, a control system, etc.) of a vehicle with a complete response for enhanced and/or otherwise improved safety, efficiency, and/or operation of the vehicle.

Figure 3:
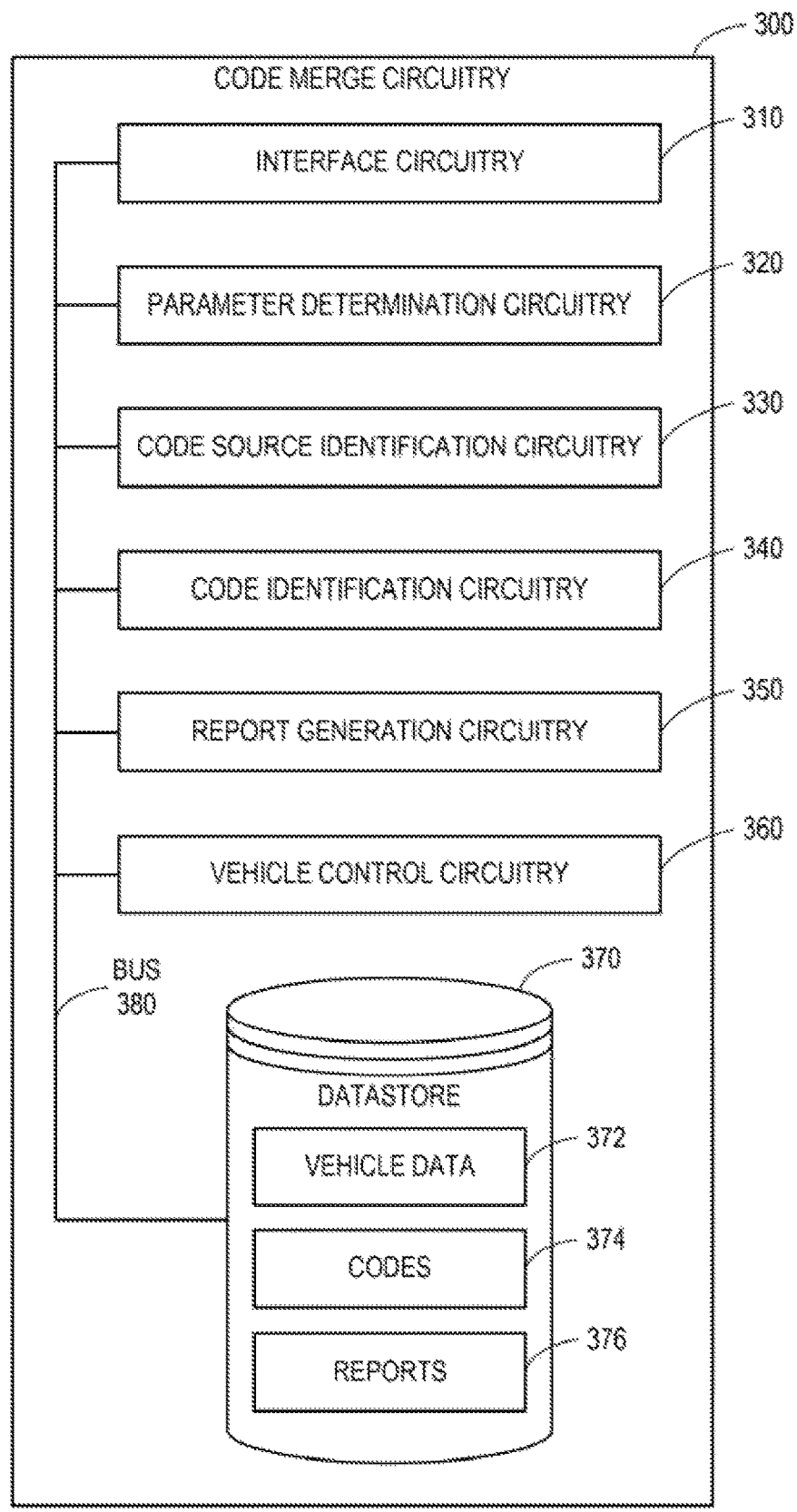
FIG. 3 is a block diagram of an example implementation of code merge circuitry to implement examples disclosed herein.

FIG. 3 is a block diagram of example code merge circuitry 300 to combine, fuse, and/or otherwise merge communication data from different data sources, such as LOS data sources and multipath data sources. In some examples, at least one of the first radio 110, the second radio 112, the third radio 114, or the fourth radio 116 of FIG. 1 can be implemented by the code merge circuitry 300. In some examples, at least one of the first radio 110, the second radio 112, the third radio 114, or the fourth radio 116 of FIG. 1 can be implemented at least in part by the code merge circuitry 300. Additionally and/or alternatively, different portion(s) of the first aircraft 102, the second aircraft 104, the terrestrial communication station 106, and/or the marine vehicle 108 may be implemented at least in part by the code merge circuitry 300. For example, an electronic system (e.g., an FCC, a remote electronics unit (REU), etc.) of the first aircraft 102 can be implemented by the code merge circuitry 300. In some examples, the code merge circuitry 300 can generate and output the second interrogation message 122 of FIG. 1 to the first radio 110. In some examples, the first radio 110 can output the second response message 124 to the code merge circuitry 300.

In some examples, the code merge circuitry 300 of FIG. 3 may be instantiated (e.g., creating an instance of, bring into being for any length of time, materialize, implement, etc.) by processor circuitry such as a central processing unit executing instructions. Additionally or alternatively, the code merge circuitry 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the code merge circuitry 300 of FIG. 3 may, thus, be instantiated at the same or different times. Some or all of the code merge circuitry 300 of FIG. 3 may be instantiated, for example, in one or more threads executing concurrently on hardware and/or in series on hardware. Moreover, in some examples, some or all of the code merge circuitry 300 of FIG. 3 may be implemented by microprocessor circuitry executing instructions to implement one or more virtual machines and/or containers.

The code merge circuitry 300 of the illustrated example of FIG. 3 includes example interface circuitry 310, example parameter determination circuitry 320, example code source identification circuitry 330, example code identification circuitry 340, example report generation circuitry 350, example vehicle control circuitry 360, an example datastore 370, and an example bus 380. In this example, the datastore 370 includes and/or otherwise stores example vehicle data 372, example codes 374, and example reports 376.

In the illustrated example of FIG. 3, the interface circuitry 310, the parameter determination circuitry 320, the code source identification circuitry 330, the code identification circuitry 340, the report generation circuitry 350, the vehicle control circuitry 360, and the datastore 370 are in communication with one(s) of each other via the bus 380. For example, the bus 380 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 380 can be implemented by any other type of computing or electrical bus.

In the illustrated example of FIG. 3, the code merge circuitry 300 includes the interface circuitry 310 to transmit and/or receive data. In some examples, the interface circuitry 310 is instantiated by processor circuitry executing interface instructions and/or configured to perform operations such as those represented by the flowcharts of FIGS. 9, 10, 11, 12, and/or 13.

In some examples, the interface circuitry 310 can transmit and/or receive data via the electromagnetic spectrum. For example, the interface circuitry 310 can transmit and/or receive infrared signals, radio signals, radar signals, etc. In some examples, the interface circuitry 310 can implement the first radio 110, the second radio 112, the third radio 114, and/or the fourth radio 116 of FIGS. 1 and/or 2. In some examples, the interface circuitry 310 can be implemented by a communication device such as a transmitter, a receiver, and/or a transceiver to facilitate exchange of data with external machines (e.g., computing or electronic devices of any kind). The communication can be by, for example, a satellite system, a line-of-sight wireless system, a cellular telephone system, an optical connection, etc. In some examples, the interface circuitry 310 can be implemented by one or more antennae. For example, the interface circuitry 310 can transmit and/or receive data via one or more antennae. In some examples, the interface circuitry 310 can determine whether to continue monitoring the one or more antennae for received data transmissions.

In the illustrated example of FIG. 3, the code merge circuitry 300 includes the parameter determination circuitry 320 to calculate and/or otherwise determine a value (e.g., a data value, a numerical value, an alphanumeric character or value, etc.) of a parameter (e.g., a data parameter, a vehicle parameter, etc.) associated with a vehicle. In some examples, the parameter determination circuitry 320 is instantiated by processor circuitry executing parameter determination instructions and/or configured to perform operations such as those represented by the flowcharts of FIGS. 9, 10, 11, 12, and/or 13.

In some examples, the parameter determination circuitry 320 can obtain data code(s) from at least one of the interface circuitry 310 or the code identification circuitry 340. The parameter determination circuitry 320 can determine a value of a parameter, such as a vehicle parameter, based on the data code(s). For example, the parameter determination circuitry 320 can determine a value of an altitude parameter associated with the second aircraft 104 based on a code transmitted by the second radio 112 to the first radio 110. In some examples, the parameter(s) is/are stored in the datastore 370 as the vehicle data 372. For example, the parameter determination circuitry 320 can determine a first value of an altitude parameter, a second value of an aircraft identifier, etc., and store the first value and/or the second value in the datastore 370 as the vehicle data 372. In some examples, the vehicle data 372 can be any type of data associated with a vehicle (e.g., the first aircraft 102, the second aircraft 104, the marine vehicle 108, etc.), such as an identifier, a speed (e.g., an air speed, a land-based speed, etc.), an altitude, a bearing, a direction, etc.

In some examples, the parameter determination circuitry 320 can determine any other parameter, such as an identification parameter (e.g., alphanumeric character(s) or value(s) that is/are representative of an identifier of a vehicle), an air speed, a bearing, an azimuth angle or direction, a range, etc., associated with a vehicle. For example, the parameter determination circuitry 320 can determine a range of the second aircraft 104 with respect to the first aircraft 102 based on a time difference between transmission of the second interrogation message 122 and receipt of the second response message 124. In some examples, the parameter determination circuitry can determine an azimuth direction of the second aircraft 104 with respect to the first aircraft 102 based on an azimuth angle of an antenna associated with the first radio 110.

In some examples, the parameter determination circuitry 320 determines whether a value of a parameter satisfies a threshold. For example, the parameter determination circuitry 320 can determine whether a range associated with a vehicle is within a threshold of an expected range. As used herein "threshold" is expressed as data such as a numerical value represented in any form, that may be used by processor circuitry as a reference for comparison operation(s).

By way of example, the parameter determination circuitry 320 can determine a range of the second aircraft 104 to be 1.5 kilometers (km) (e.g., nautical kilometers) (or equivalent in nautical miles) from the first aircraft 102 based on the second interrogation message 122 and the second response message 124. In some examples, the parameter determination circuitry 320 can determine that an expected range of the second aircraft 104 is 1.4 km and the determined range of 1.5 km is within a 0.2 km threshold (and thereby satisfies the threshold) of the expected range of 1.4 km. After the determination that the determined range of 1.5 km is within a threshold of the expected range of 1.4 km, the parameter determination circuitry 320 can identify data associated with the second response message 124 as LOS data based on at least one of the determined range or the expected range.

By way of another example, the parameter determination circuitry 320 can determine a range of the second aircraft 104 to be 0.1 kilometers km from the first aircraft 102 based on the second interrogation message 122 and the second response message 124. In some examples, the parameter determination circuitry 320 can determine that an expected range of the second aircraft 104 is 1.4 km and the determined range of 0.1 km is not within a 0.2 km threshold of the expected range of 1.4 km. After the determination that the determined range of 0.1 km is not within a threshold of the expected range of 1.4 km (and thereby does not satisfy the threshold), the parameter determination circuitry 320 can identify data associated with the second response message 124 as ghost communication data (e.g., tail ghost data, tail ghost communication data, etc.) based on at least one of the determined range or the expected range. For example, the parameter determination circuitry 320 can determine that the data associated with the second response message 124 is reflected off of a tail of the first aircraft 102. In some examples, the parameter determination circuitry 320 can identify the data associated with the second response message 124 as ghost communication data, which can be a type of multipath data.

By way of yet another example, the parameter determination circuitry 320 can determine an azimuth angle associated with the first radio 110 and the second response message 124 to be 168 degrees. In some examples, the parameter determination circuitry 320 can determine that an expected azimuth angle is 164 degrees and the determined azimuth angle of 168 degrees is within a 5 degree threshold of the expected azimuth angle of 164 degrees. After the determination that the determined azimuth angle of 168 degrees is within a threshold of the expected azimuth angle of 164 degrees (and thereby satisfies the threshold), the parameter determination circuitry 320 can identify data associated with the second response message 124 as LOS data based on at least one of the determined azimuth angle or the expected azimuth angle.

By way of yet another example, the parameter determination circuitry 320 can determine an azimuth angle associated with the first radio 110 and the second response message 124 to be 182 degrees. In some examples, the parameter determination circuitry 320 can determine that an expected azimuth angle is 164 degrees and the determined azimuth angle of 182 degrees is not within a 5 degree threshold of the expected azimuth angle of 164 degrees. After the determination that the determined azimuth angle of 182 degrees is not within a threshold of the expected azimuth angle of 164 degrees (and thereby does not satisfy the threshold), the parameter determination circuitry 320 can identify data associated with the second response message 124 as ghost communication data based on at least one of the determined azimuth angle or the expected azimuth angle. For example, the parameter determination circuitry 320 can determine that the data associated with the second response message 124 is reflected off of a tail of the first aircraft 102. In some examples, the parameter determination circuitry 320 can identify the data associated with the second response message 124 as ghost communication data, which can be a type of multipath data.

In the illustrated example of FIG. 3, the code merge circuitry 300 includes the code source identification circuitry 330 to identify an origin or source of received data codes. In some examples, the code source identification circuitry 330 is instantiated by processor circuitry executing code source identification instructions and/or configured to perform operations such as those represented by the flowcharts of FIGS. 9, 10, 11, 12, and/or 13.

In some examples, the code source identification circuitry 330 can obtain first data received at a first time by the first radio 110 and second data received at a second time by the first radio 110. The code source identification circuitry 330 can determine that the first data has a first range (e.g., a first range that can be determined by the parameter determination circuitry 320) and the second data has a second range (e.g., a second range that can be determined by the parameter determination circuitry 320). In some examples, the code source identification circuitry 330 can determine that the first data is LOS data and the second data is multipath data based on the first range being less than the second range. For example, the multipath data can have a greater range associated with it than the LOS data because of the one or more bounces that the signal(s) carrying the multipath data encountered during transmission.

In some examples, the code source identification circuitry 330 determines whether received data is LOS data or multipath data based on a number of received replies of the received data. For example, the code source identification circuitry 330 can detect a first pulse signal (e.g., a first received reply signal, a first hit, a first data hit, etc.) and a second pulse signal (e.g., a second received reply signal, a second hit, a second data hit, etc.) in the received data. In some examples, the code source identification circuitry 330 can determine that the received data has a relatively high likelihood of being LOS data based on having at least two pulse signals. In some examples, the code source identification circuitry 330 can determine that the received data has a relatively low likelihood of being LOS data (e.g., may be multipath data) based on a detection of only the first pulse signal in the received data.

In the illustrated example of FIG. 3, the code merge circuitry 300 includes the code identification circuitry 340 to detect and/or otherwise identify codes (e.g., data codes) in received data. For example, the code identification circuitry 340 can identify codes and store the identified codes in the datastore 370 as the codes 374. In some examples, the code identification circuitry 340 is instantiated by processor circuitry executing code identification instructions and/or configured to perform operations such as those represented by the flowcharts of FIGS. 9, 10, 11, 12, and/or 13.

In some examples, the code identification circuitry 340 can detect and/or otherwise identify a first code and a second code in data received at an antenna of a radio. For example, the code identification circuitry 340 can determine that the received data is not missing any data portions based on receiving an expected number of codes. In some examples, the code identification circuitry 340 can detect the first code and not the second code. For example, the code identification circuitry 340 can determine that the received data is missing one or more data portions based on receiving only the first code (e.g., receiving a different number of codes than expected). In some examples, the code identification circuitry 340 can determine that received LOS data and/or received multipath data is/are missing data portion(s). In some examples, the code identification circuitry 340 can determine that received LOS data is missing a data code that is included in received multipath data. In some examples, the code identification circuitry 340 can determine that received multipath data is missing a data code that is included in received LOS data.

In some examples, the code identification circuitry 340 can determine that received data is based on one or more modes (e.g., communication modes, IFF modes, etc.). For example, the code identification circuitry 340 can determine that data received at an antenna associated with a radio is Mode 1 data, Mode 2 data, Mode 3/A data, etc., based on a time interval between detected pulse signals.

In some examples, the code identification circuitry 340 can compare codes in different datasets. For example, the code identification circuitry 340 can compare one or more first bits of a first code in first data (e.g., LOS data) to one or more second bits of a second code in second data (e.g., multipath data). In some examples, the first code can correspond to the second code. For example, the first code and the second code can be expected to be representative of the same data. In some examples, the code identification circuitry 340 can determine that the first code and the second code are different by a specified number of data bits (e.g., a number of differences between the data bits of the first and second data codes). For example, the code identification circuitry 340 can determine that the first code and the second code are unlikely to be representative of the same data based on a determination that the first code and the second code are different by a number of bits that satisfy a threshold (e.g., a difference threshold of 1 bit, 2 bits, etc.). For example, the code identification circuitry 340 can determine that the first code and the second code are different by 3 bits; determine that 3 bits satisfies the threshold of 2 bits; and determine that the first code and the second code are unlikely to be representative of the same data.

In the illustrated example of FIG. 3, the code merge circuitry 300 includes the report generation circuitry 350 to output communication data based on a merge of first data, such as LOS data, and second data, such as multipath data. In some examples, the report generation circuitry 350 is instantiated by processor circuitry executing report generation instructions and/or configured to perform operations such as those represented by the flowcharts of FIGS. 9, 10, 11, 12, and/or 13.

In some examples, the report generation circuitry 350 can receive data codes, such as one or more data codes representative of an identification and/or an altitude associated with a vehicle (e.g., the first aircraft 102, the second aircraft 104, etc.). The report generation circuitry 350 can generate a report (e.g., an air traffic report, an air traffic control report, an air traffic management report, a data report, etc.) that includes the identification and/or the altitude. In some examples, the report generation circuitry 350 can store the report in the datastore 370 as one(s) of the reports 376. In some examples, one(s) of the reports 376 can include data codes for two or more aircraft. For example, a first one of the reports 376 can include first data code(s) associated with the first aircraft 102, second data code(s) associated with the second aircraft 104, and/or third data code(s) associated with the marine vehicle 108. In some examples, the report generation circuitry 350 can output the report to a different computing or electronic system, such as a tracking system (e.g., an object or vehicle tracking system), an identification system (e.g., an object or vehicle identification system), etc. For example, the tracking system can instruct a vehicle, such as the second aircraft 104, to change an altitude, a bearing, an air speed, etc., of the second aircraft 104 based on the identification code and/or the altitude of a different vehicle, such as the first aircraft 102.

In some examples, the report generation circuitry 350 can generate a report based on a merge (or merging) of data from different data sources. For example, the report generation circuitry 350 can extract (i) a first data code from first data, such as data identified as LOS data, and (ii) a second data code from second data, such as data identified as multipath data. In some examples, the report generation circuitry 350 can determine that the second data code is missing and/or otherwise not included in the first data. Advantageously, the report generation circuitry 350 can merge portion(s) of the first data with portion(s) of the second data to generate the report. For example, the report generation circuitry 350 can include the first data code and the second data code in a report, which can be provided to and/or consumed by a different electronic system.

In some examples, the report generation circuitry 350 can achieve output of communication data with enhanced, heightened, or increased data integrity. For example, the report generation circuitry 350 can determine that data identified as multipath data is unreliable based on a range associated with the multipath data, a difference in expected versus received values of one or more data bits of the multipath data, etc., and/or any combination(s) thereof. In some examples, after a determination that portion(s) of the multipath data is/are unreliable for air traffic management function(s), the report generation circuitry 350 can discard and/or otherwise remove the portion(s) of the multipath data (or other types of data such as LOS data that are determined to be unfit for air traffic management function(s)) from output(s) to other computing or electronic systems.

In the illustrated example of FIG. 3, the code merge circuitry 300 includes the vehicle control circuitry 360 to cause movement of a target (e.g., a target object, a target vehicle, etc.) based on communication data, which can include data from one or more data sources (e.g., a LOS data source, a multipath data source, etc.). In some examples, the vehicle control circuitry 360 is instantiated by processor circuitry executing vehicle control instructions and/or configured to perform operations such as those represented by the flowcharts of FIGS. 9, 10, 11, 12, and/or 13.

In some examples, the vehicle control circuitry 360 controls and/or causes control of a vehicle based on communication data, which can be implemented by and/or otherwise correspond to a report including one or more data codes. For example, the vehicle control circuitry 360 can determine that a report associated with the second aircraft 104 indicates that the second aircraft 104 has an altitude of 35,000 feet. In some examples, the vehicle control circuitry 360 can cause the first aircraft 102 to decrease an altitude of the first aircraft 102 from 35,000 feet to 30,000 feet to achieve the requisite altitude clearance between aircraft. For example, the vehicle control circuitry 360 can transmit, deliver, and/or otherwise output a command, a direction, an instruction, etc., to an FCC of the first aircraft 102 to cause the first aircraft 102 to carry out or perform a vehicle control operation or action, such as change altitude, air speed, etc., and/or any combination(s) thereof.

In the illustrated example of FIG. 3, the code merge circuitry 300 includes the datastore 370 to record data, such as the vehicle data 372, the codes 374, and/or the reports 376. In some examples, the datastore 370 is instantiated by processor circuitry executing datastore instructions and/or configured to perform operations such as those represented by the flowcharts of FIGS. 9, 10, 11, 12, and/or 13.

In some examples, the datastore 370 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 370 may additionally or alternatively be implemented by one or more double data rate (DDR) memories, such as DDR, DDR2, DDR3, DDR4, DDR5, mobile DDR (mDDR), DDR SDRAM, etc. The datastore 370 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the datastore 370 is illustrated as a single datastore, the datastore 370 may be implemented by any number and/or type(s) of datastores. Furthermore, the data stored in the datastore 370 may be in any data format such as, for example, binary data, comma delimited data, tab delimited data, structured query language (SQL) structures, etc.

The term "data" as used herein means any indicia, signals (e.g., analog signals, digital signals, electromagnetic signals, radio signals, radar signals, etc.), marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

While an example manner of implementing the code merge circuitry 300 is illustrated in FIG. 3, one or more of the elements, processes, and/or devices illustrated in FIG. 3 may be combined, divided, re-arranged, omitted, eliminated, and/or implemented in any other way. Further, the interface circuitry 310, the parameter determination circuitry 320, the code source identification circuitry 330, the code identification circuitry 340, the report generation circuitry 350, the vehicle control circuitry 360, the datastore 370, the bus 380, and/or, more generally, the example code merge circuitry 300, may be implemented by hardware alone or by hardware in combination with software and/or firmware. Thus, for example, any of the interface circuitry 310, the parameter determination circuitry 320, the code source identification circuitry 330, the code identification circuitry 340, the report generation circuitry 350, the vehicle control circuitry 360, the datastore 370, the bus 380, and/or, more generally, the example code merge circuitry 300, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example code merge circuitry 300 may include one or more elements, processes, and/or devices in addition to, or instead of, those illustrated in FIG. 3, and/or may include more than one of any or all of the illustrated elements, processes and devices.

Figure 4:
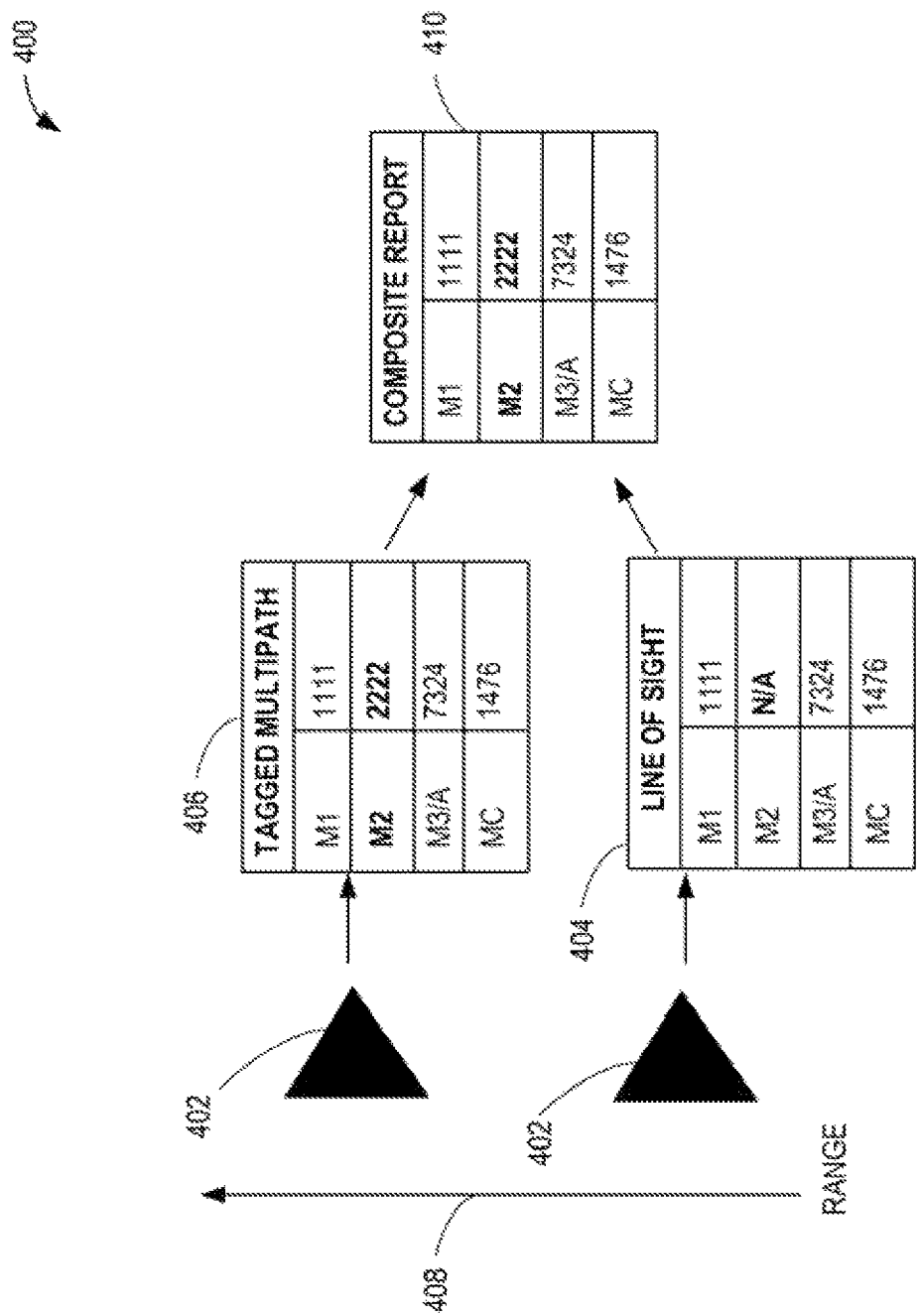
FIG. 4 is an illustration of an example code merge technique that may be implemented by the example code merge circuitry of FIG. 3.

FIG. 4 is an illustration of a first example code merge technique 400 that may be implemented by the code merge circuitry 300 of FIG. 3, and/or, more generally, by one(s) of the radios 110, 112, 114, 116 of FIGS. 1 and/or 2. The first code merge technique 400 illustrates example interface circuitry 402 that can receive IFF messages, such as the interrogation messages 118, 122, 126, 130 and/or the response messages 120, 124, 128, 132 of FIGS. 1 and/or 2. For example, the interface circuitry 402 can be implemented by the first radio 110, the second radio 112, the third radio 114, and/or the fourth radio 116 of FIGS. 1 and/or 2. In some examples, the interface circuitry 402 can be implemented by the interface circuitry 310 of FIG. 3.

In example operation, the interface circuitry 402 can receive first example data 404 (identified by LINE OF SIGHT) at a first time and second example data 406 (identified by TAGGED MULTIPATH) at a second time after the first time. In some examples, the first data 404 is representative of a first report (e.g., a first communication report, a first data report, etc.). In some examples, the second data 406 is representative of a second report (e.g., a second communication report, a second data report, etc.). In some examples, the first data 404 can implement the second response message 124 of FIGS. 1 and/or 2, and the second data 406 can implement the fifth response message 202 of FIG. 2. In the illustrated example, the interface circuitry 402 can determine a first range (of an example range scale 408) associated with the first data 404 and a second range associated with the second data 406. In example operation, the interface circuitry 402 can determine that the first data 404 is LOS data and the second data 406 is multipath data based on the first range being less than the second range.

In example operation, the interface circuitry 402 can determine that the first data 404 includes Mode 1 (identified by M1), Mode 3/A (identified by M3/A), and Mode C (identified by MC) data. The interface circuitry 402 can determine that the first data 404 does not include Mode 2 (identified by M2) data. For example, the interface circuitry 402 can determine that the first data 404 has an M1 code of 1111, an M3/A code of 7324, and an MC code of 1476. After a determination that the first data 404 is missing an M3/A code (identified by N/A), the interface circuitry 402, and/or, more generally, the code merge circuitry 300 of FIG. 3, can determine that the second data 406 includes the missing M2 code. Advantageously, the interface circuitry 402, and/or, more generally, the code merge circuitry 300 of FIG. 3, can generate an example report 410 (identified by COMPOSITE REPORT) based on a merge (e.g., a data merge or merging) of one or more data portions of the first data 404 and one or more data portions of the second data 406. In example operation, the interface circuitry 402, and/or, more generally, the code merge circuitry 300 of FIG. 3, can output the report 410 to a computing or electronic system, such as a tracking system, an identification system, an FCC, etc., and/or any combination(s) thereof.

In some examples, the data that is represented by the codes of the first data 404 and/or the second data 406 can implement the vehicle data 372 of FIG. 3. In some examples, the codes of the first data 404 and/or the second data 406 can implement ones of the codes 374 of FIG. 3. In some examples, the report 410 can implement one of the reports 376 of FIG. 3.

Figure 5:
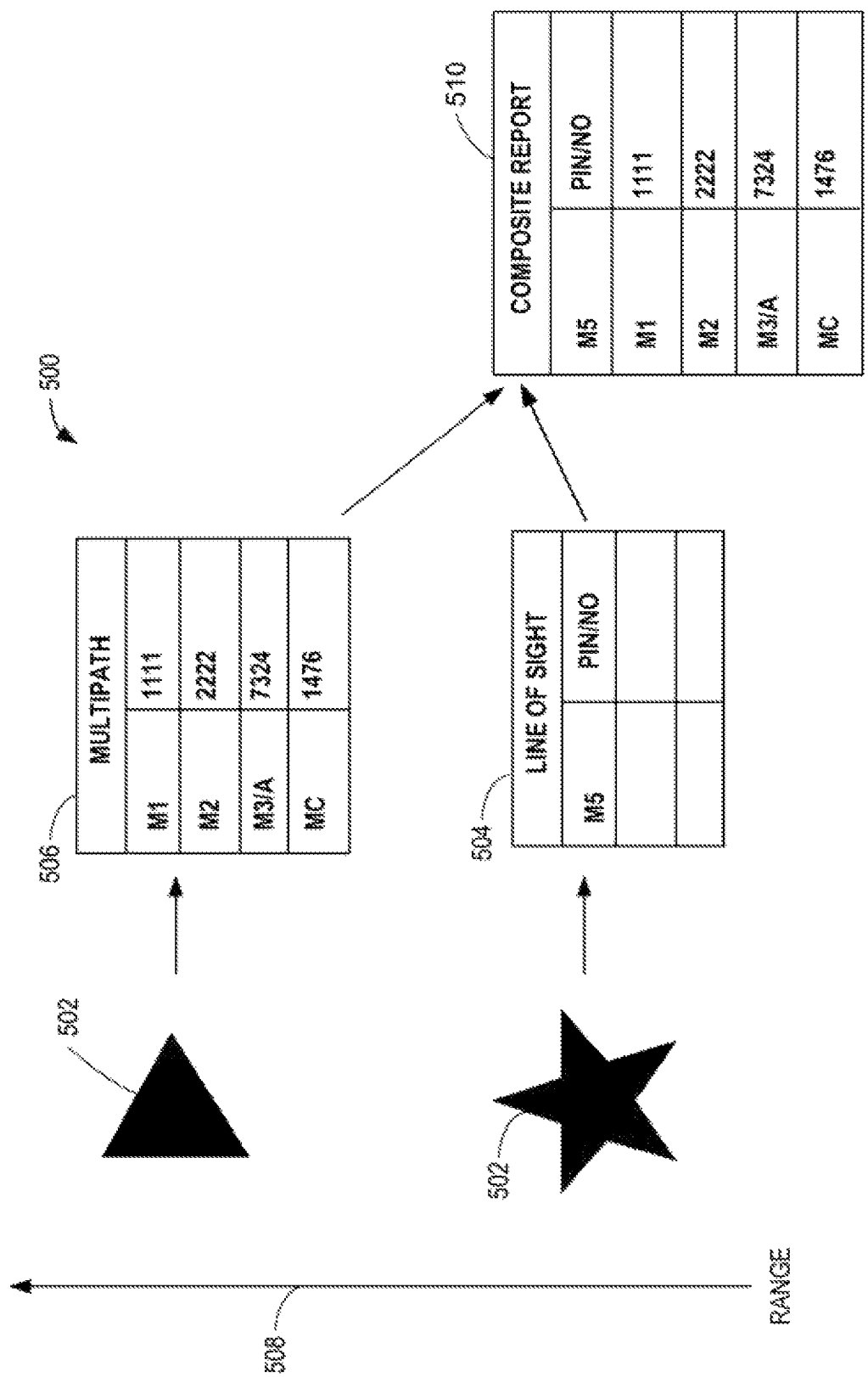
FIG. 5 is an illustration of another example code merge technique that may be implemented by the example code merge circuitry of FIG. 3.

FIG. 5 is an illustration of a second example code merge technique 500 that may be implemented by the code merge circuitry 300 of FIG. 3, and/or, more generally, by one(s) of the radios 110, 112, 114, 116 of FIGS. 1 and/or 2. The second code merge technique 500 illustrates example interface circuitry 502 that can receive IFF messages, such as the interrogation messages 118, 122, 126, 130 and/or the response messages 120, 124, 128, 132 of FIGS. 1 and/or 2. For example, the interface circuitry 502 can be implemented by the first radio 110, the second radio 112, the third radio 114, and/or the fourth radio 116 of FIGS. 1 and/or 2. In some examples, the interface circuitry 502 can be implemented by the interface circuitry 310 of FIG. 3.

In example operation, the interface circuitry 502 can receive first example data 504 (identified by LINE OF SIGHT) at a first time and second example data 506 (identified by MULTIPATH) at a second time after the first time. In some examples, the first data 504 is representative of a first report (e.g., a first communication report, a first data report, etc.). In some examples, the second data 506 is representative of a second report (e.g., a second communication report, a second data report, etc.). In some examples, the first data 504 can implement the second response message 124 of FIGS. 1 and/or 2, and the second data 506 can implement the fifth response message 202 of FIG. 2. In the illustrated example, the interface circuitry 502 can determine a first range (of an example range scale 508) associated with the first data 504 and a second range associated with the second data 506. In example operation, the interface circuitry 502 can determine that the first data 504 is LOS data and the second data 506 is multipath data based on the first range being less than the second range. In some examples, the first data 504 and/or the second data 506 can be special interest flight (SIF) data, such as air traffic management data associated with non-civilian aircraft.

In example operation, the interface circuitry 502 can determine that the first data 504 includes Mode 5 (identified by M5) data. The interface circuitry 502 can determine that the first data 504 does not include Mode 1 (identified by M1), Mode 2 (identified by M2), Mode 3/A (identified by M3/A), and Mode C (identified by MC) data. For example, the interface circuitry 502 can determine that the first data 504 has an M5 code of PIN/NO. In some examples, SIF data can correspond to M1, M2, M3/A, and/or MC data or codes.

In example operation, after a determination that the first data 504 is missing an M1, an M2, an M3/A, and an MC code, the interface circuitry 502, and/or, more generally, the code merge circuitry 300 of FIG. 3, can determine that the second data 506 includes the missing M1, M2, M3/A, and MC codes. Advantageously, the interface circuitry 502, and/or, more generally, the code merge circuitry 300 of FIG. 3, can generate an example report 510 (identified by COMPOSITE REPORT) based on a merge of one or more data portions (e.g., the M5 code of PIN/NO) of the first data 504 and one or more data portions (e.g., the M1 code of 1111, the M2 code of 2222, the M3 code of 7324, and the M4 code of 1476) of the second data 506. In example operation, the interface circuitry 502, and/or, more generally, the code merge circuitry 300 of FIG. 3, can output the report 510 to a computing or electronic system, such as a tracking system, an identification system, an FCC, etc., and/or any combination(s) thereof.

In some examples, the data that is represented by the codes of the first data 504 and/or the second data 506 can implement the vehicle data 372 of FIG. 3. In some examples, the codes of the first data 504 and/or the second data 506 can implement ones of the codes 374 of FIG. 3. In some examples, the report 510 can implement one of the reports 376 of FIG. 3.

Figure 6:
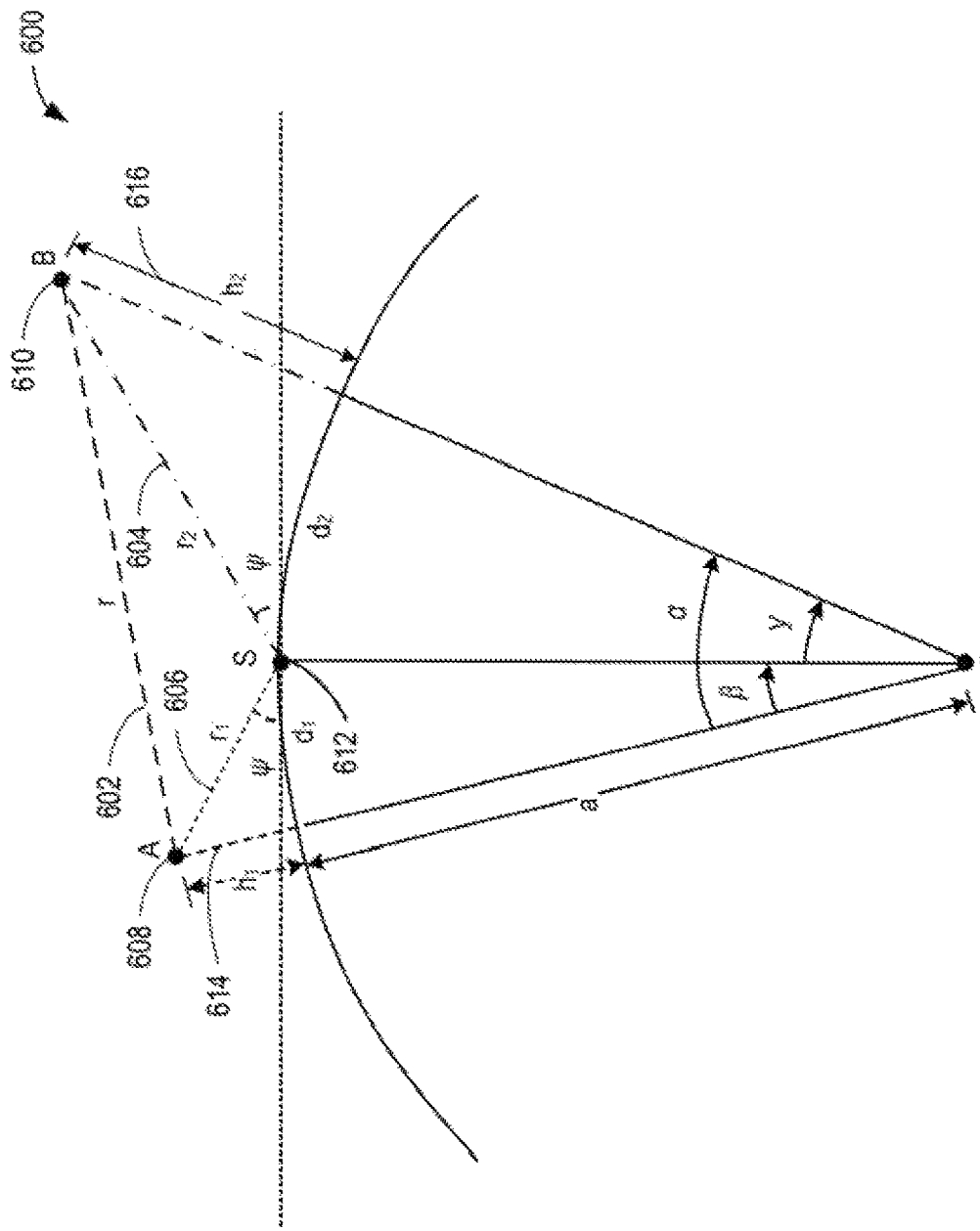
FIG. 6 is an illustration of an example line-of-sight communication path and an example multipath communication path.

FIG. 6 is an illustration of an example LOS communication path 602 and an example multipath communication path 604, 606 in an example IFF communication architecture 600. Further depicted in the IFF communication architecture 600 is a first example vehicle 608 (identified by point A), a second example vehicle 610 (identified by point B), and an example bounce point 612 (identified by point S). In some examples, the first vehicle 608 and the second vehicle 610 are aerial vehicles (e.g., aircraft).

In example operation, the first vehicle 608 can transmit an interrogation message to the second vehicle 610 via at least one of the LOS communication path 602 or the multipath communication path 604, 606. In response to receiving the interrogation message, the second vehicle 610 can transmit a response message to the first vehicle 608 via at least one of the LOS communication path 602 or the multipath communication path 604. In example operation, the first vehicle 608 (e.g., a radio and/or interface circuitry of the first vehicle 608) can determine a first range of data received via the LOS communication path 602 (identified by r). In example operation, the first vehicle 608 (e.g., a radio and/or interface circuitry of the first vehicle 608) can determine a second range of data received via the multipath communication path 604 based on the example of Equation (1) below:

$$r = \frac{r + r_1 + r_2}{2} \qquad \text{Equation (1)}$$

In the example of Equation (1) above, r is the determined range of the multipath target. In example operation, the first vehicle 608 can determine the range of the second vehicle 610 based on a first example altitude 614 (identified by h 1) and a second example altitude 616 (identified by h 2). For example, the first vehicle 608 can determine the first altitude 614 based on obtaining its own altitude data from onboard data storage and/or processor circuitry. In some examples, the first vehicle 608 can determine the second altitude 616 based on data that is represented by a data code of the received response message (e.g., the response message transmitted by the second vehicle 610 to the first vehicle 608).

Figure 7:
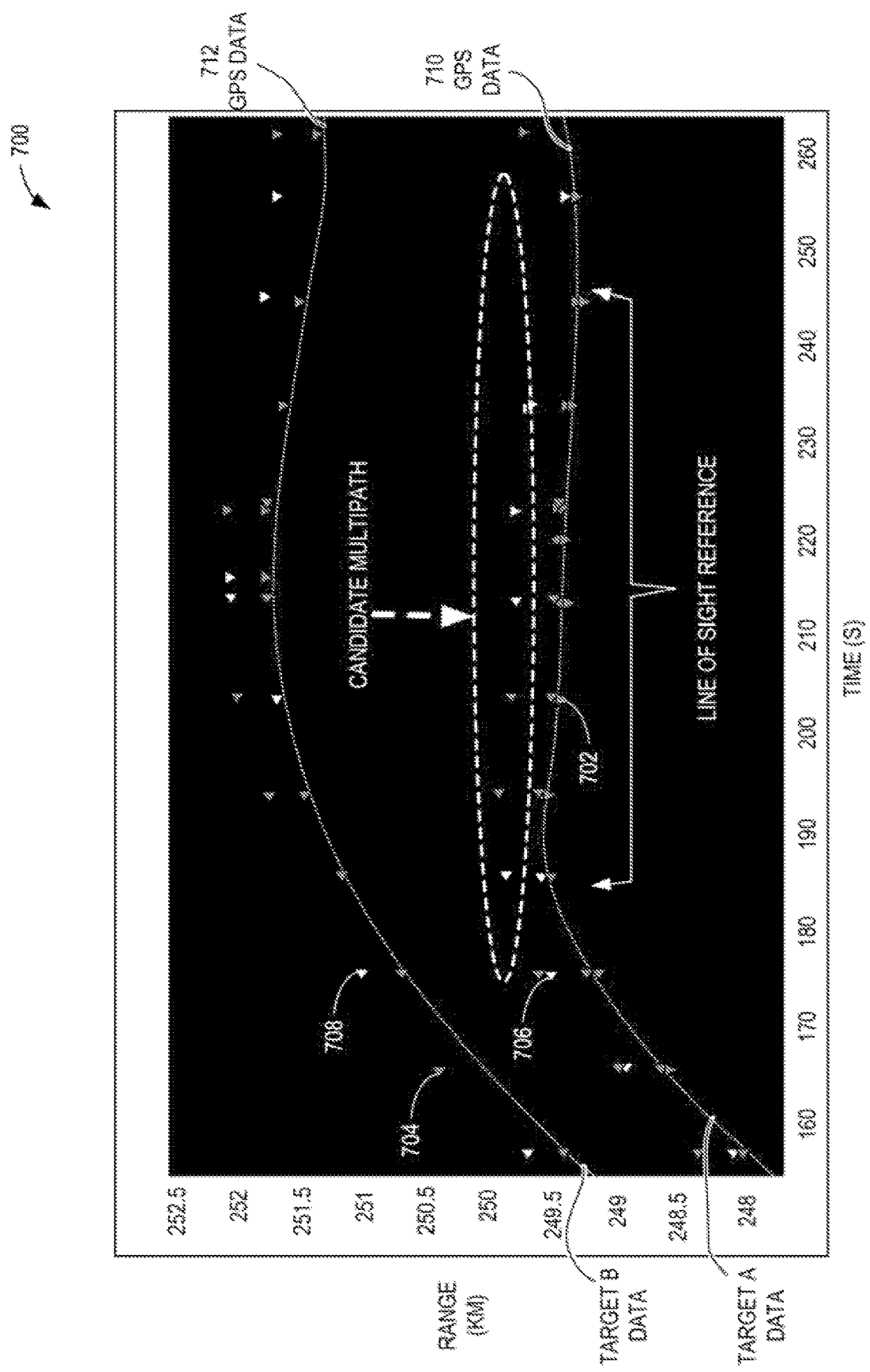
FIG. 7 is a graph of example line-of-sight data and example multipath data.

FIG. 7 is a graph 700 of example LOS data 702, 704 and example multipath data 706, 708. For example, the LOS data 702, 704 and the multipath data 706, 708 can be received by one(s) of the radios 110, 112, 114, 116 of FIGS. 1 and/or 2, the interface circuitry 310 of FIG. 3, the interface circuitry 402 of FIG. 4, and/or the interface circuitry 502 of FIG. 5. The x-axis of the graph 700 is time in seconds (S) and the y-axis of the graph 700 is range in km.

The LOS data 702, 704 includes first example LOS data 702 associated with a first target and second example LOS data 704 associated with a second target. The multipath data 706, 708 includes first example multipath data 706 associated with the first target and second example multipath data 708 associated with the second target. Further depicted in the illustrated example is first example Global Positioning System (GPS) data 710 associated with the first target and second example GPS data 712 associated with the second target.

In example operation, the code merge circuitry 300 of FIG. 3 can identify the first LOS data 702 as LOS data based on respective ranges of the first LOS data 702. In example operation, the code merge circuitry 300 of FIG. 3 can identify the first multipath data 706 as multipath data based on respective ranges of the first multipath data 706. For example, the code merge circuitry 300 can determine that a first range of first data of the first LOS data 702 is within a threshold of an expected range of the first target. By way of another example, the code merge circuitry 300 can determine that a second range of second data of the first multipath data 706 is not within a threshold of an expected range of the first target. In some examples, the code merge circuitry 300 can determine whether the first range and/or the second range are within the threshold based on a comparison of the first range and/or the second range to the LOS reference that corresponds to the first GPS data 710.

In example operation, the code merge circuitry 300 can determine that the first multipath data 706 is candidate multipath data that can be used to supplement missing or not received data of the first LOS data 702. For example, the code merge circuitry 300 can determine that data code(s) of the first multipath data 706 can be used to generate a report when the first LOS data 702 does not include the data code(s) included in the first multipath data 706.

Figure 8:
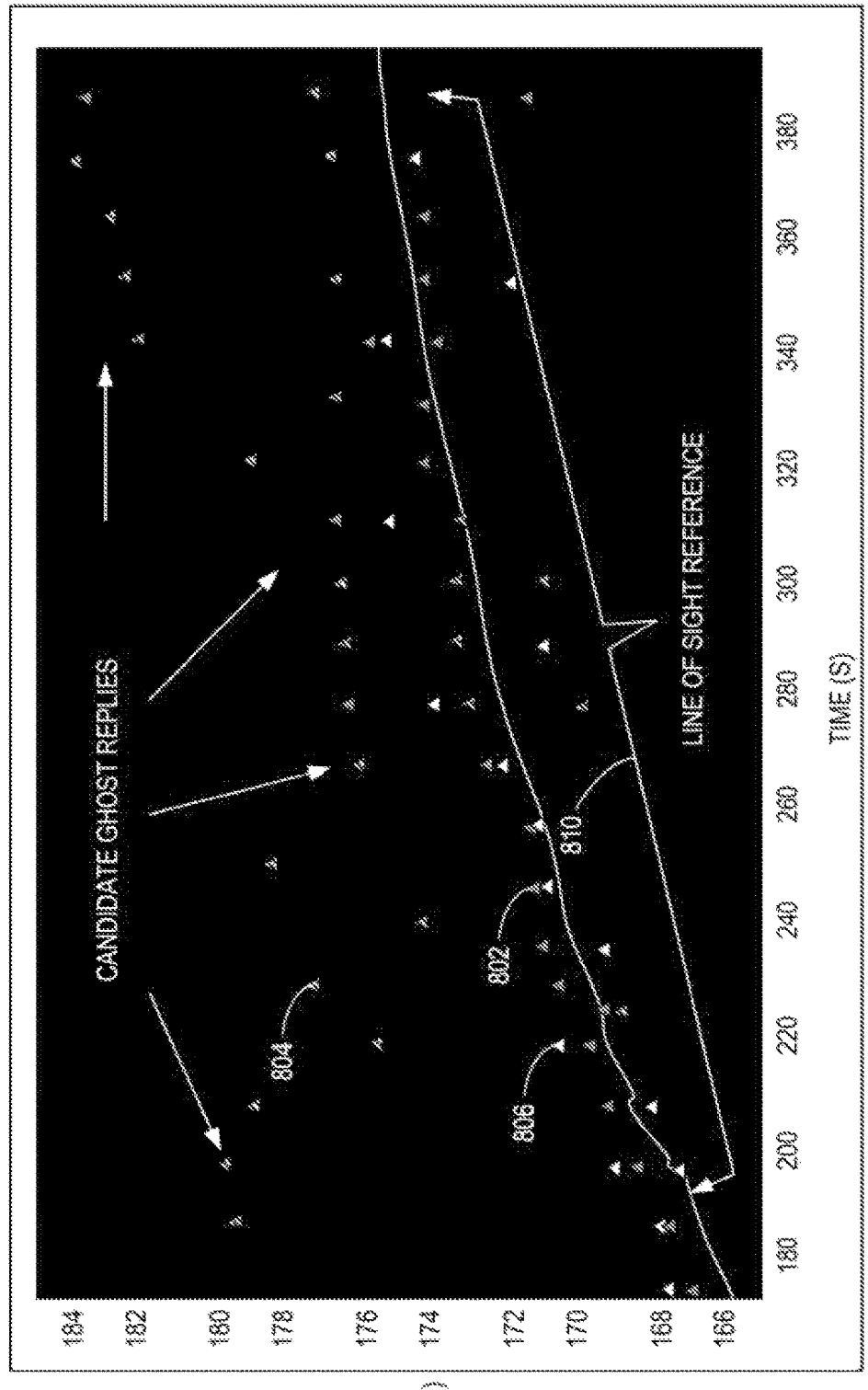
FIG. 8 is a graph of example line-of-sight data and example candidate ghost communication data.

FIG. 8 is a graph 800 of example LOS data 802 and example candidate ghost communication data 804. Further depicted in the graph 800 of the illustrated example of FIG. 8 is example multipath data 806 and an example LOS reference 808. For example, the LOS reference 808 can correspond to GPS data associated with a target. In some examples, the LOS data 802, the candidate ghost communication data 804, and the multipath data 806 can be received by one(s) of the radios 110, 112, 114, 116 of FIGS. 1 and/or 2, the interface circuitry 310 of FIG. 3, the interface circuitry 402 of FIG. 4, and/or the interface circuitry 502 of FIG. 5. The x-axis of the graph 800 is time in seconds (S) and the y-axis of the graph 800 is azimuth angle in degrees.

In some examples, the LOS data 802, the candidate ghost communication data 804, and the multipath data 806 are associated with one or more targets, such as the first aircraft 102 and the second aircraft 104 of FIGS. 1 and/or 2. For example, the LOS data 802 can correspond to the second response message 124 of FIGS. 1 and/or 2. In some examples, the multipath data 806 can correspond to the fifth response message 202 of FIG. 2. In some examples, the candidate ghost communication data 804 can correspond to signal reflections of a portion of the first aircraft 102, such as a vertical stabilizer of the first aircraft 102.

In example operation, the code merge circuitry 300 of FIG. 3 can identify the LOS data 802 as LOS data based on respective azimuth angles of the LOS data 802. In example operation, the code merge circuitry 300 of FIG. 3 can identify the multipath data 806 as multipath data based on respective azimuth angles of the multipath data 806. For example, the code merge circuitry 300 can determine that an azimuth angle of first data of the LOS data 802 is within a threshold of an expected azimuth angle associated with the target. By way of another example, the code merge circuitry 300 can determine that a second azimuth angle of second data of the multipath data 806 is within the threshold of the expected range of the target. By way of yet another example, the code merge circuitry 300 can determine that a third azimuth angle of third data of the candidate ghost communication data 804 is not within the threshold of the expected range of the target. In some examples, the code merge circuitry 300 can determine whether the first azimuth angle, the second azimuth angle, and/or the third azimuth angle are within the threshold based on a comparison of the first azimuth angle, the second azimuth angle, and/or the third azimuth angle to the LOS reference 810 (e.g., azimuth angles associated with GPS data of the target).

In example operation, the code merge circuitry 300 can determine that the candidate ghost communication data 804 is ghost communication data that may not be used to supplement missing or not received data of the LOS data 802. For example, the code merge circuitry 300 can determine that data code(s) of the candidate ghost communication data 804 is to be discarded. In some examples, the code merge circuitry 300 can determine that data code(s) of the multipath data 806 can be used to generate a report when the LOS data 802 does not include the data code(s) included in the multipath data 806.

Flowcharts representative of example machine-readable instructions, which may be executed to configure processor circuitry to implement the code merge circuitry 300 of FIG. 3, and/or more generally, one(s) of the radios 110, 112, 114, 116 of FIGS. 1 and/or 2, and/or, more generally, one(s) of the first aircraft 102, the second aircraft 104, the terrestrial communication station 106, and/or the marine vehicle 108 of FIGS. 1 and/or 2, is shown in FIGS. 9-13. The machine-readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer-readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer-readable storage media may include one or more mediums located in one or more hardware devices. Further, although the example program is described with reference to the flowcharts illustrated in FIGS. 9-13, many other methods of implementing the code merge circuitry 300 of FIG. 3, and/or more generally, one(s) of the radios 110, 112, 114, 116 of FIGS. 1 and/or 2, and/or, more generally, one(s) of the first aircraft 102, the second aircraft 104, the terrestrial communication station 106, and/or the marine vehicle 108 of FIGS. 1 and/or 2, may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 9-13 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer-readable medium, non-transitory computer-readable storage medium, non-transitory machine-readable medium, and non-transitory machine-readable storage medium are expressly defined to include any type of computer-readable storage device and/or storage disk and to exclude propagating signals and to exclude transmission media. As used herein, the terms "computer-readable storage device" and "machine-readable storage device" are defined to include any physical (mechanical and/or electrical) structure to store information, but to exclude propagating signals and to exclude transmission media. Examples of computer-readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
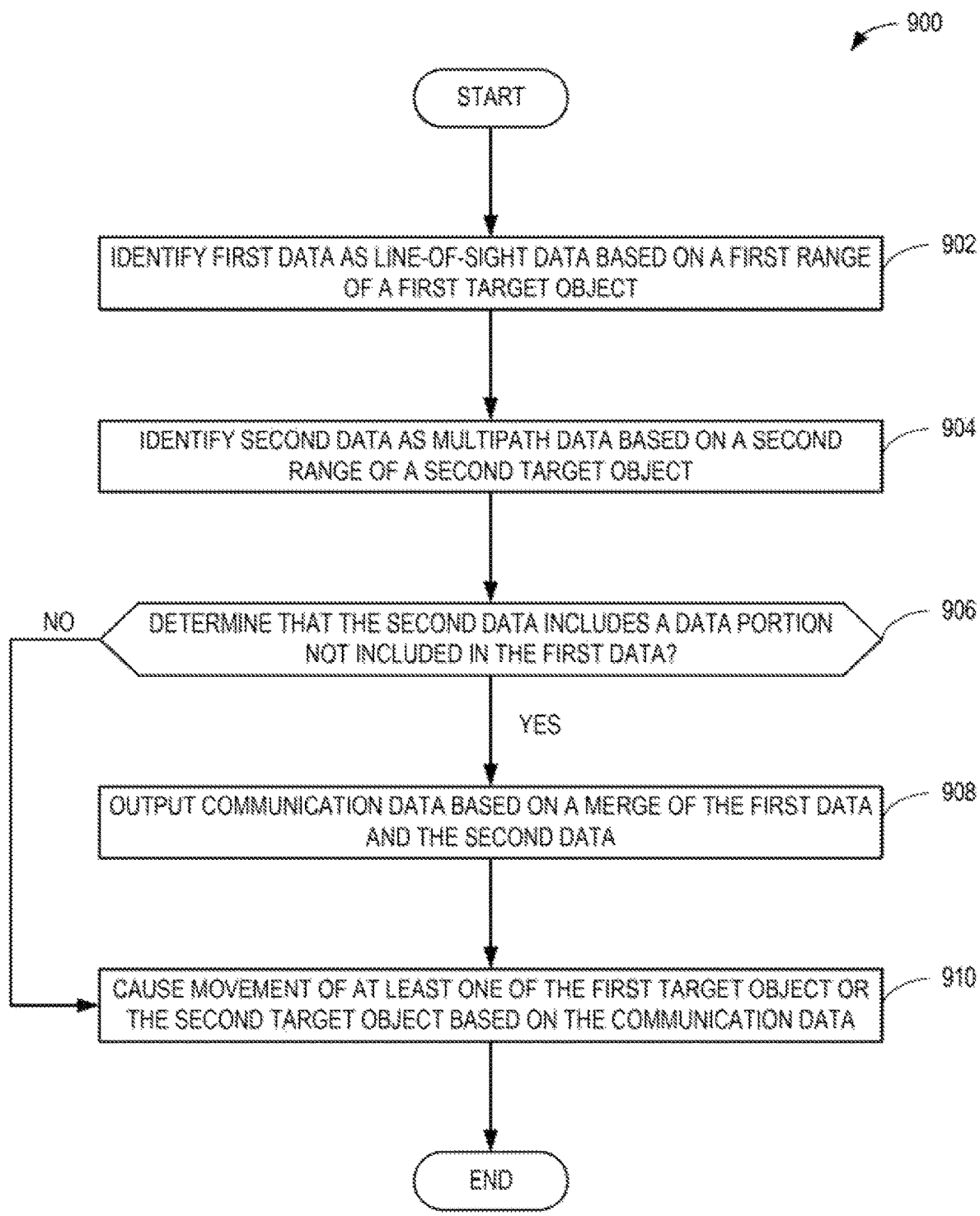
FIG. 9 is a flowchart representative of example machine-readable instructions and/or example operations that may be executed by example processor circuitry to implement the example code merge circuitry of FIG. 3 to cause movement of a target object based on communication data.

FIG. 9 is a flowchart representative of example machine-readable instructions and/or example operations 900 that may be executed and/or instantiated by processor circuitry to cause movement of a target object based on communication data. The example machine-readable instructions and/or the example operations 900 of FIG. 9 begin at block 902, at which the code merge circuitry 300 of FIG. 3 identifies first data as line-of-sight data based on a first range of a first target object. For example, the interface circuitry 310 (FIG. 3) can receive the first data 404 of FIG. 4, which can be associated with a first target, such as the second aircraft 104 of FIGS. 1 and/or 2. In some examples, the parameter determination circuitry 320 (FIG. 3) can determine a first range associated with the first target based on a time duration between transmission of an interrogation message and receipt of a response message. In some examples, the code source identification circuitry 330 (FIG. 3) can identify the first data 404 as LOS data based on the first range. For example, the code source identification circuitry 330 can determine that a difference between the first range and an expected range satisfies a threshold.

At block 904, the code merge circuitry 300 identifies second data as multipath data based on a second range of a second target object. For example, the interface circuitry 310 can receive the second data 406 of FIG. 4, which can be associated with the first target or a second target different from the first target. In some examples, the parameter determination circuitry 320 can determine a second range associated with the second target based on a time duration between transmission of the interrogation message and receipt of the response message. In some examples, the code source identification circuitry 330 can identify the second data 406 as multipath data based on the second range. For example, the code source identification circuitry 330 can determine that a difference between the second range and the expected range does not satisfy a threshold. In some examples, the code source identification circuitry 330 can determine that the first data 404 and the second data 406 are from the same target, source, origin, etc., based on the identification of the second data 406 as multipath data.

At block 906, the code merge circuitry 300 determines whether the second data includes a data portion not included in the first data. For example, the code identification circuitry 340 (FIG. 3) can determine that the second data 406 includes a data portion, such as an M2 code, that is not included in the first data 404.

At block 908, the code merge circuitry 300 outputs communication data based on a merge of the first data and the second data. For example, the report generation circuitry 350 (FIG. 3) can generate the report 410 of FIG. 4 based on a merge of one or more data portions of the first data 404 and one or more data portions of the second data 406. In some examples, the report 410 can be representative of communication data.

At block 910, the code merge circuitry 300 causes movement of at least one of the first target object or the second target object based on the communication data. For example, the vehicle control circuitry 360 (FIG. 3) can instruct the second aircraft 104 to change a vehicle control parameter of the second aircraft 104, such as an altitude, air speed, bearing, etc., of the second aircraft 104, based on the report 410. Advantageously, the example machine-readable instructions and/or the example operations 900 of FIG. 9 can be executed and/or instantiated by processor circuitry to utilize communication data from multipath sources to output complete reports, which can be used to improve the efficiency, operation, and/or control of computing or electronic systems associated with vehicles. After causing movement of at least one of the first target object or the second target object based on the communication data at block 910, the example machine-readable instructions and/or the example operations 900 of FIG. 9 conclude.

Figure 10:
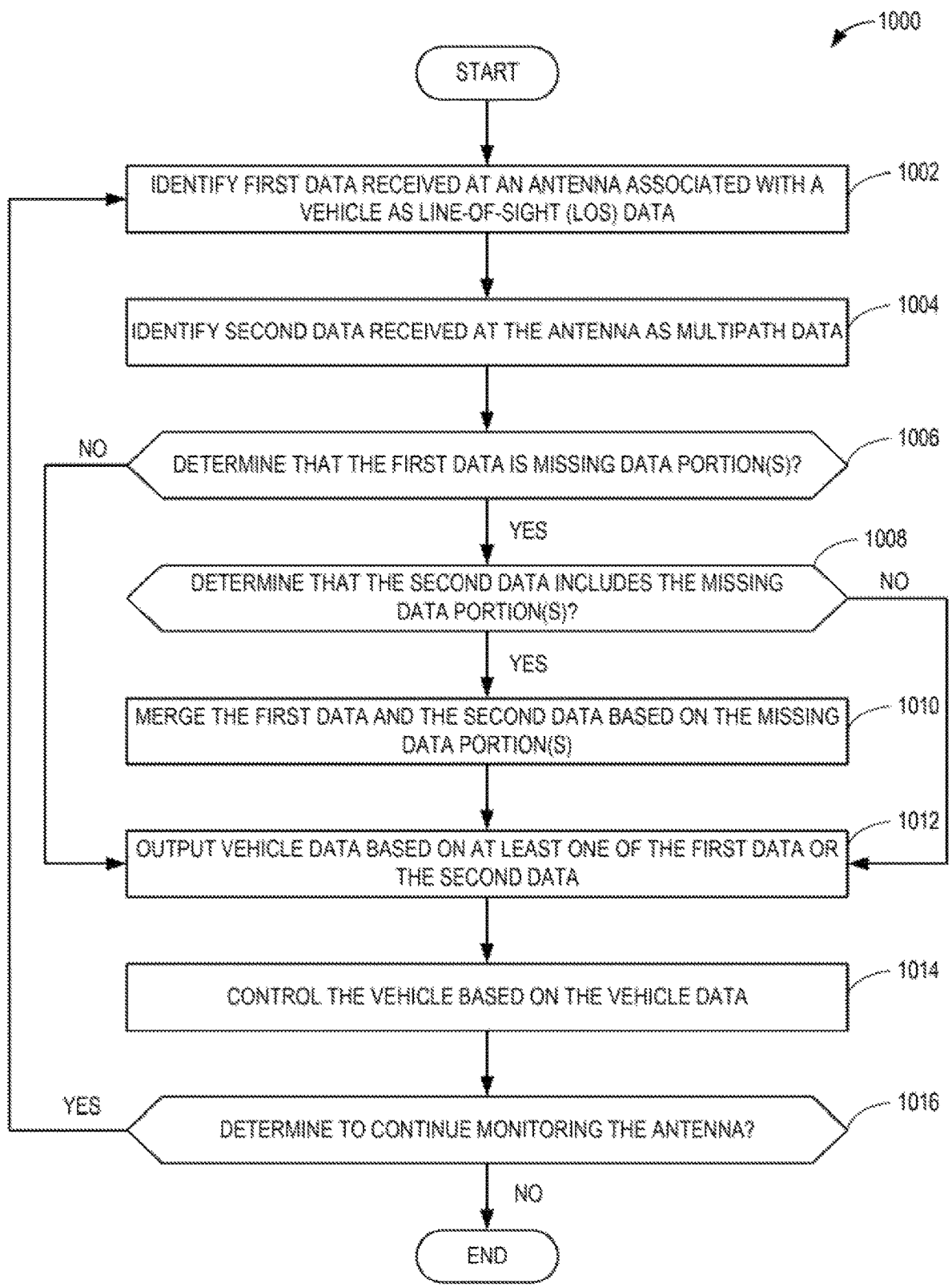
FIG. 10 is a flowchart representative of example machine-readable instructions and/or example operations that may be executed by example processor circuitry to implement the example code merge circuitry of FIG. 3 to control a vehicle based on vehicle data.

FIG. 10 is a flowchart representative of example machine-readable instructions and/or example operations 1000 that may be executed and/or instantiated by processor circuitry to control a vehicle based on vehicle data. The example machine-readable instructions and/or the example operations 1000 of FIG. 10 begin at block 1002, at which the code merge circuitry 300 of FIG. 3 identifies first data received at an antenna associated with a vehicle as line-of-sight (LOS) data. For example, the interface circuitry 310 (FIG. 3) can receive the first data 404 of FIG. 4 at the first aircraft 102 of FIGS. 1 and/or 2. Alternatively, the interface circuitry 310 can receive the first data 404 at the marine vehicle 108 of FIG. 1. In some examples, the first data 404 is associated with a first target, such as the second aircraft 104 of FIGS. 1 and/or 2. In some examples, the parameter determination circuitry 320 (FIG. 3) can determine a first range associated with the first target based on a time duration between transmission of the second interrogation message 122 of FIGS. 1 and/or 2 and receipt of the second response message 124 of FIGS. 1 and/or 2. In some examples, the code source identification circuitry 330 (FIG. 3) can identify the first data 404 as LOS data based on the first range. For example, the code source identification circuitry 330 can determine that the first range is within a threshold of an expected range and/or meets the expected range.

At block 1004, the code merge circuitry 300 identifies second data received at the antenna as multipath data. For example, the interface circuitry 310 can receive the second data 406 of FIG. 4 at the first aircraft 102, which can be associated with the first target or a second target different from the first target. Alternatively, the interface circuitry 310 can receive the second data 406 at the marine vehicle 108 of FIG. 1. In some examples, the parameter determination circuitry 320 can determine a second range associated with the first target or the second target based on a time duration between transmission of the second interrogation message 122 and receipt of the fifth response message 202 of FIG. 2. In some examples, the code source identification circuitry 330 can identify the second data 406 as multipath data based on the second range. For example, the code source identification circuitry 330 can determine that the second range is not within a threshold of an expected range and/or does not meet the expected range. In some examples, the code source identification circuitry 330 can determine that the first data 404 and the second data 406 are from the same target, source, origin, etc., based on the identification of the second data 406 as multipath data.

At block 1006, the code merge circuitry 300 determines whether the first data is missing data portion(s). For example, the code identification circuitry 340 (FIG. 3) can determine that the first data 404 is missing the M2 code.

If, at block 1006, the code merge circuitry 300 determines that the first data is not missing data portion(s), control proceeds to block 1012. Otherwise, control proceeds to block 1008.

At block 1008, the code merge circuitry 300 determines whether the second data includes the missing data portion(s). For example, the code identification circuitry 340 can determine that the second data 406 includes the M2 code missing from the first data 404.

If, at block 1008, the code merge circuitry 300 determines that the second data does not include the missing data portion(s), control proceeds to block 1012. Otherwise, control proceeds to block 1010. For example, at block 1010, the report generation circuitry 350 (FIG. 3) can output the report 410 of FIG. 4 based on the M1, M3/A, and MC codes from the first data 404.

At block 1010, the code merge circuitry 300 merges the first data and the second data based on the missing data portion(s). For example, the report generation circuitry 350 can merge the first data 404 and the second data 406 by selecting the M1, M3/A, and MC codes from the first data 404 and the M2 code from the second data 406.

At block 1012, the code merge circuitry 300 outputs vehicle data based on at least one of the first data or the second data. For example, the report generation circuitry 350 can output the report 410 of FIG. 4 to a computing or electronic system. In some examples, the report 410, or portion(s) thereof, can be representative of the vehicle data 372 (FIG. 3), such as an identifier, an altitude, etc., of the second aircraft 104.

At block 1014, the code merge circuitry 300 controls the vehicle based on the vehicle data. For example, the vehicle control circuitry 360 (FIG. 3) can output a command (e.g., a control command) to control the first aircraft 102. For example, the vehicle control circuitry 360 can generate the command to change an altitude of the first aircraft 102 based on the altitude of the second aircraft 104.

At block 1016, the code merge circuitry 300 determines whether to continue monitoring the antenna. For example, the interface circuitry 310 (FIG. 3) can determine whether to continue monitoring output(s) from the antenna or associated circuitry.

If, at block 1016, the code merge circuitry 300 determines to continue monitoring the antenna, control returns to block 1002. Otherwise, the example machine-readable instructions and/or the example operations 1000 of FIG. 10 conclude.

Figure 11:
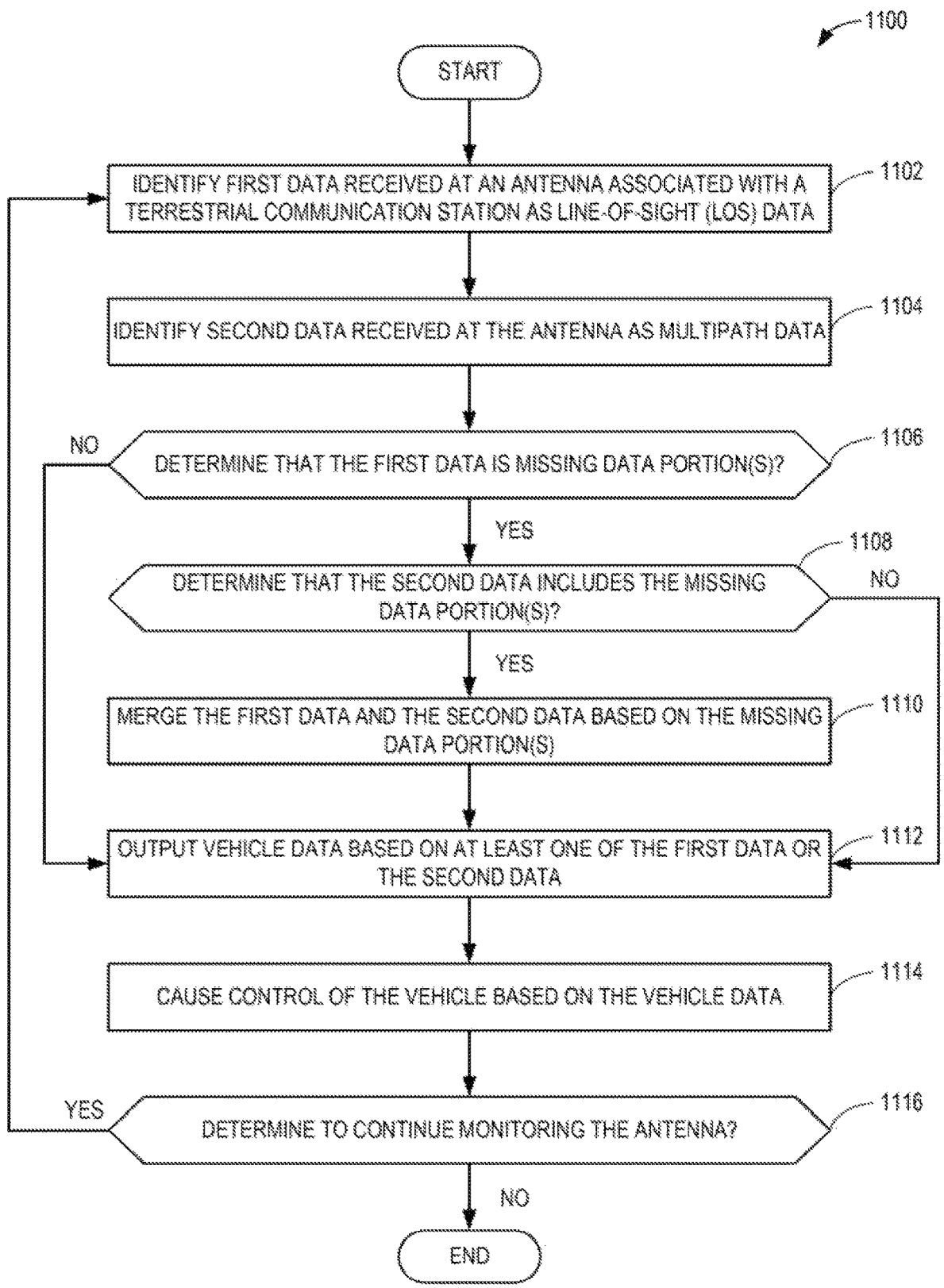
FIG. 11 is a flowchart representative of example machine-readable instructions and/or example operations that may be executed by example processor circuitry to implement the example code merge circuitry of FIG. 3 to cause control of a vehicle based on vehicle data.

FIG. 11 is a flowchart representative of example machine-readable instructions and/or example operations 1100 that may be executed and/or instantiated by processor circuitry to cause control of a vehicle based on vehicle data. The example machine-readable instructions and/or the example operations 1100 of FIG. 11 begin at block 1102, at which the code merge circuitry 300 of FIG. 3 identifies first data received at an antenna associated with a terrestrial communication station as line-of-sight (LOS) data. For example, the interface circuitry 310 (FIG. 3) can receive the first data 504 of FIG. 5 at the terrestrial communication station 106 of FIG. 1. In some examples, the first data 504 is associated with a first target, such as the first aircraft 102 of FIGS. 1 and/or 2. In some examples, the parameter determination circuitry 320 (FIG. 3) can determine a first range associated with the first target based on a time duration between transmission of the first interrogation message 118 of FIG. 1 and receipt of the first response message 120 of FIG. 1. In some examples, the code source identification circuitry 330 (FIG. 3) can identify the first data 504 as LOS data based on the first range. For example, the code source identification circuitry 330 can determine that the first range is within a threshold of an expected range and/or meets the expected range.

At block 1104, the code merge circuitry 300 identifies second data received at the antenna as multipath data. For example, the interface circuitry 310 can receive the second data 506 of FIG. 5 at the terrestrial communication station 106, which can be associated with the first target or a second target that is different from the first target. In some examples, the parameter determination circuitry 320 can determine a second range associated with the first target or the second target based on a time duration between transmission of the first interrogation message 118 and receipt of a multipath response message in response to the first interrogation message 118. In some examples, the code source identification circuitry 330 can identify the second data 506 as multipath data based on the second range. For example, the code source identification circuitry 330 can determine that the second range is not within a threshold of an expected range and/or does not meet the expected range. In some examples, the code source identification circuitry 330 can determine that the first data 504 and the second data 506 of FIG. 5 are from the same target, source, origin, etc., based on the identification of the second data 506 as multipath data. For example, the code source identification circuitry 330 can determine that one or more portions of the first data 504 are the same as one or more portions of the second data 506.

At block 1106, the code merge circuitry 300 determines whether the first data is missing data portion(s). For example, the code identification circuitry 340 (FIG. 3) can determine that the first data 504 does not include and/or the interface circuitry 310 did not detect at least one of the M1, M2, M3/A, or MC codes.

If, at block 1106, the code merge circuitry 300 determines that the first data is not missing data portion(s), control proceeds to block 1112. Otherwise, control proceeds to block 1108.

At block 1108, the code merge circuitry 300 determines whether the second data includes the missing data portion(s). For example, the code identification circuitry 340 can determine that the second data 506 includes the at least one of the M1, M2, M3/A, or MC codes.

If, at block 1108, the code merge circuitry 300 determines that the second data does not include the missing data portion(s), control proceeds to block 1112. For example, the report generation circuitry 350 (FIG. 3) can generate the report 510 of FIG. 5 based on the first data 504. In some examples, the report generation circuitry 350 can discard one or more portions of the second data 506.

If, at block 1108, the code merge circuitry 300 determines that the second data includes the missing data portion(s), control proceeds to block 1110.

At block 1110, the code merge circuitry 300 merges the first data and the second data based on the missing data portion(s). For example, the report generation circuitry 350 can combine one or more data portions of the first data 504 with one or more data portions of the second data 506.

At block 1112, the code merge circuitry 300 outputs vehicle data based on at least one of the first data or the second data. For example the report generation circuitry 350 can output the report 510 based on the M5 code of the first data 504 and the M1, M2, M3/A, and MC codes of the second data 506.

At block 1114, the code merge circuitry 300 causes control of the vehicle based on the vehicle data. For example, the vehicle control circuitry 360 (FIG. 3) can generate a command to control the first aircraft 102 based on the report 510 of FIG. 5. For example, the vehicle control circuitry 360 can generate the command to cause a change of an altitude of the first aircraft 102 based on the altitude of the first aircraft 102 (or a different aircraft, such as the second aircraft 104 of FIGS. 1 and/or 2). In some examples, the vehicle control circuitry 360 can instruct the interface circuitry 310 to transmit the command to the first aircraft 102 to effectuate the change of the first aircraft 102.

At block 1116, the code merge circuitry 300 determines whether to continue monitoring the antenna. For example, the interface circuitry 310 can determine whether to continue monitoring output(s) from the antenna or associated circuitry of the third radio 114 of the terrestrial communication station 106.

If, at block 1116, the code merge circuitry 300 determines to continue monitoring the antenna, control returns to block 1102. Otherwise, the example machine-readable instructions and/or the example operations 1100 of FIG. 11 conclude.

Figure 12:
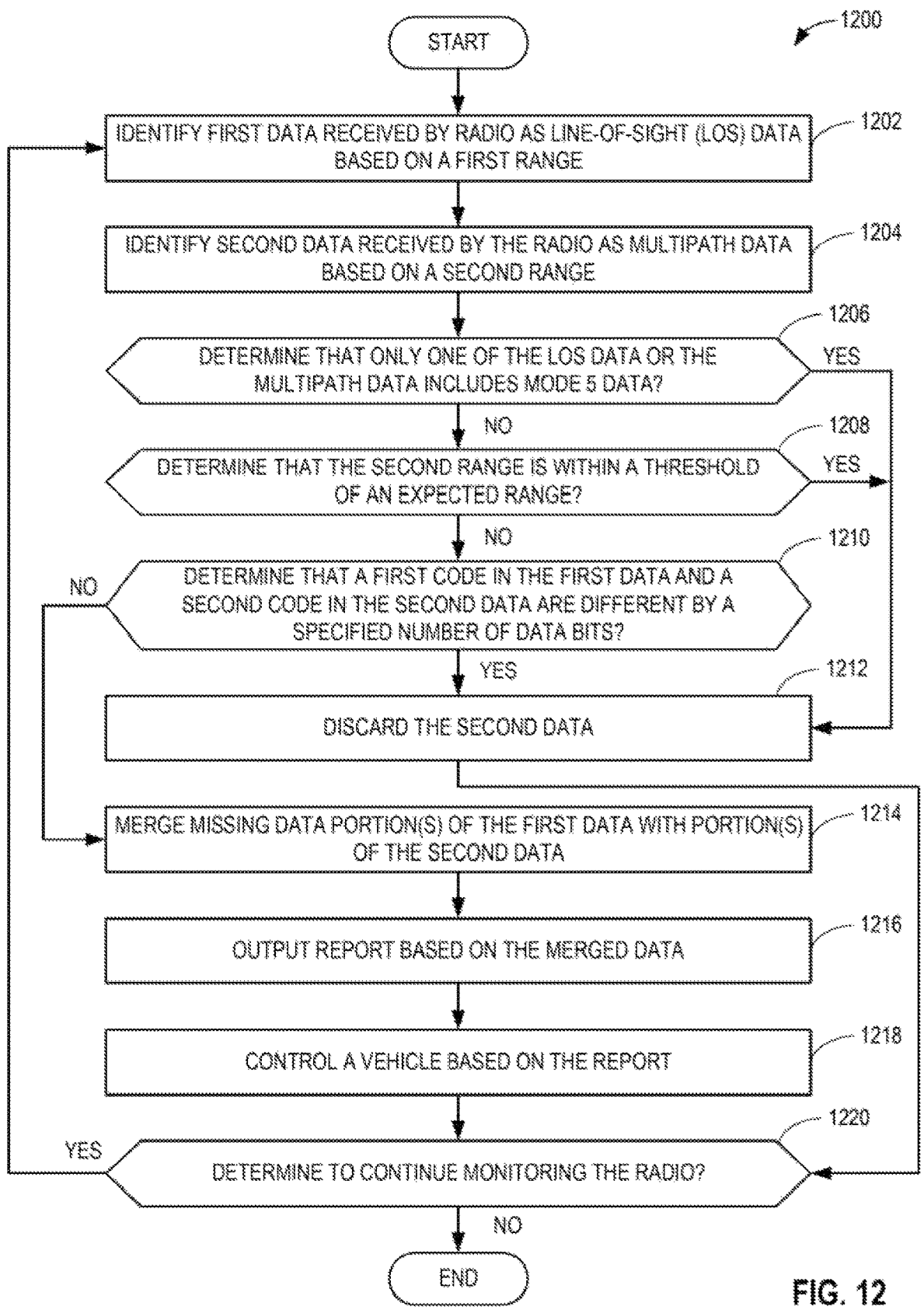
FIG. 12 is a flowchart representative of example machine-readable instructions and/or example operations that may be executed by example processor circuitry to implement the example code merge circuitry of FIG. 3 to control a vehicle based on a report.

FIG. 12 is a flowchart representative of example machine-readable instructions and/or example operations 1200 that may be executed and/or instantiated by processor circuitry to control a vehicle based on a report. The example machine-readable instructions and/or the example operations 1200 of FIG. 12 begin at block 1202, at which the code merge circuitry 300 of FIG. 3 identifies first data received by radio as line-of-sight (LOS) data based on a first range. For example, the interface circuitry 310 (FIG. 3) can receive the first data 504 of FIG. 5 at the third radio 114 of the terrestrial communication station 106 of FIG. 1. In some examples, the first data 504 is associated with a first target, such as the first aircraft 102 of FIGS. 1 and/or 2. In some examples, the parameter determination circuitry 320 (FIG. 3) can determine a first range associated with the first target based on a time duration between transmission of the first interrogation message 118 of FIG. 1 from the third radio 114 and receipt of the first response message 120 of FIG. 1 by the third radio 114. In some examples, the code source identification circuitry 330 (FIG. 3) can identify the first data 504 as LOS data based on the first range. For example, the code source identification circuitry 330 can determine that the first range is within a threshold of an expected range and/or meets the expected range.

At block 1204, the code merge circuitry 300 identifies second data received by the radio as multipath data based on a second range. For example, the interface circuitry 310 can receive the second data 506 of FIG. 5 at the third radio 114 of the terrestrial communication station 106. In some examples, the second data 506 can be associated with the first target or a second target that is different from the first target. In some examples, the parameter determination circuitry 320 can determine a second range associated with the first target or the second target based on a time duration between transmission of the first interrogation message 118 by the third radio 114 and receipt of a multipath response message by the third radio 114 in response to the first interrogation message 118. In some examples, the code source identification circuitry 330 can identify the second data 506 as multipath data based on the second range. For example, the code source identification circuitry 330 can determine that the second range is not within a threshold of an expected range and/or does not meet the expected range. In some examples, the code source identification circuitry 330 can determine that the first data 504 and the second data 506 of FIG. 5 are from the same target, source, origin, etc., based on the identification of the second data 506 as multipath data. For example, the code source identification circuitry 330 can determine that one or more portions of the first data 504 are the same as one or more portions of the second data 506.

At block 1206, the code merge circuitry 300 determines whether only one of the LOS data or the multipath data includes Mode 5 data. For example, the code identification circuitry 340 (FIG. 3) can determine that the first data 504 includes a Mode 5 code and the second data 506 does not include a Mode 5 code.

If, at block 1206, the code merge circuitry 300 determines that either (i) both the LOS data and the multipath data include Mode 5 data or (ii) neither of the LOS data and the multipath data include Mode 5 data, control proceeds to block 1208. Otherwise, control proceeds to block 1212.

At block 1208, the code merge circuitry 300 determines whether the second range is within a threshold of an expected range. For example, the parameter determination circuitry 320 can determine that the second range is not within a threshold of an expected range for the first aircraft 102 and thereby can determine that the second data 506 is multipath data. In some examples, the parameter determination circuitry 320 can determine that the second range is within a threshold of an expected range for the first aircraft 102 and thereby can determine that the second data 506 may be ghost communication data.

If, at block 1208, the code merge circuitry 300 determines that the second range is within a threshold of an expected range, control proceeds to block 1212. For example, the code source identification circuitry 330 may determine that the first data 504 and the second data 506 are not from the same data source and thereby the report generation circuitry 350 can discard the second data 506. After discarding the second data at block 1212, control proceeds to block 1220.

If, at block 1208, the code merge circuitry 300 determines that the second range is not within a threshold of an expected range, control proceeds to block 1210. For example, the code source identification circuitry 330 may determine that the first data 504 and the second data 506 are from the same data source.

At block 1210, the code merge circuitry 300 determines whether a first code in the first data and a second code in the second data are different by a specified number of data bits. Assume for example, that the first data 504 includes an M1 code. In such an example, the code identification circuitry 340 can compare (e.g., compare on a per-bit value basis) the M1 code in the first data 504 and the M1 code in the second data 506. In some examples, the code identification circuitry 340 can determine that the M1 code in the first data 504 has a plurality of different bit values (e.g., two or more, three or more, etc.) than the M1 code in the second data 506 and thereby can determine that the second data 506 is not to be used for report generation.

If, at block 1210, the code merge circuitry 300 determines that a first code in the first data and a second code in the second data are different by a specified number of data bits, control proceeds to block 1212. For example, the report generation circuitry 350 can discard the second data 506 based on determination(s) that the second data 506 may be unreliable or have reduced data integrity.

If, at block 1210, the code merge circuitry 300 determines that a first code in the first data and a second code in the second data are not different by a specified number of data bits, control proceeds to block 1214.

At block 1214, the code merge circuitry 300 merges missing data portion(s) of the first data with portion(s) of the second data. For example, the report generation circuitry 350 can aggregate the M5 code in the first data 504 and the M1, M2, M3/A, and MC codes in the second data 506.

At block 1216, the code merge circuitry 300 outputs a report based on the merged data. For example, the report generation circuitry 350 can output the report 510 of FIG. 5 based on the merging of the first data 504 and the second data 506.

At block 1218, the code merge circuitry 300 controls a vehicle based on the report. For example, the vehicle control circuitry 360 (FIG. 3) can generate a command to control the first aircraft 102 based on the report 510 of FIG. 5. For example, the vehicle control circuitry 360 can generate the command to cause a change of an air speed, an altitude, a bearing, etc., and/or any combination(s) thereof, of the first aircraft 102 based on data included in and/or otherwise represented by the report 510 of FIG. 5. In some examples, the vehicle control circuitry 360 can instruct the interface circuitry 310 to transmit the command to the first aircraft 102 to effectuate the change of the first aircraft 102.

At block 1220, the code merge circuitry 300 determines whether to continue monitoring the radio. For example, the interface circuitry 310 can determine whether to continue monitoring the third radio 114 for receipts of communication messages.

If, at block 1220, the code merge circuitry 300 determines to continue monitoring the radio, control returns to block 1202. Otherwise, the example machine-readable instructions and/or the example operations 1200 of FIG. 12 conclude.

Figure 13:
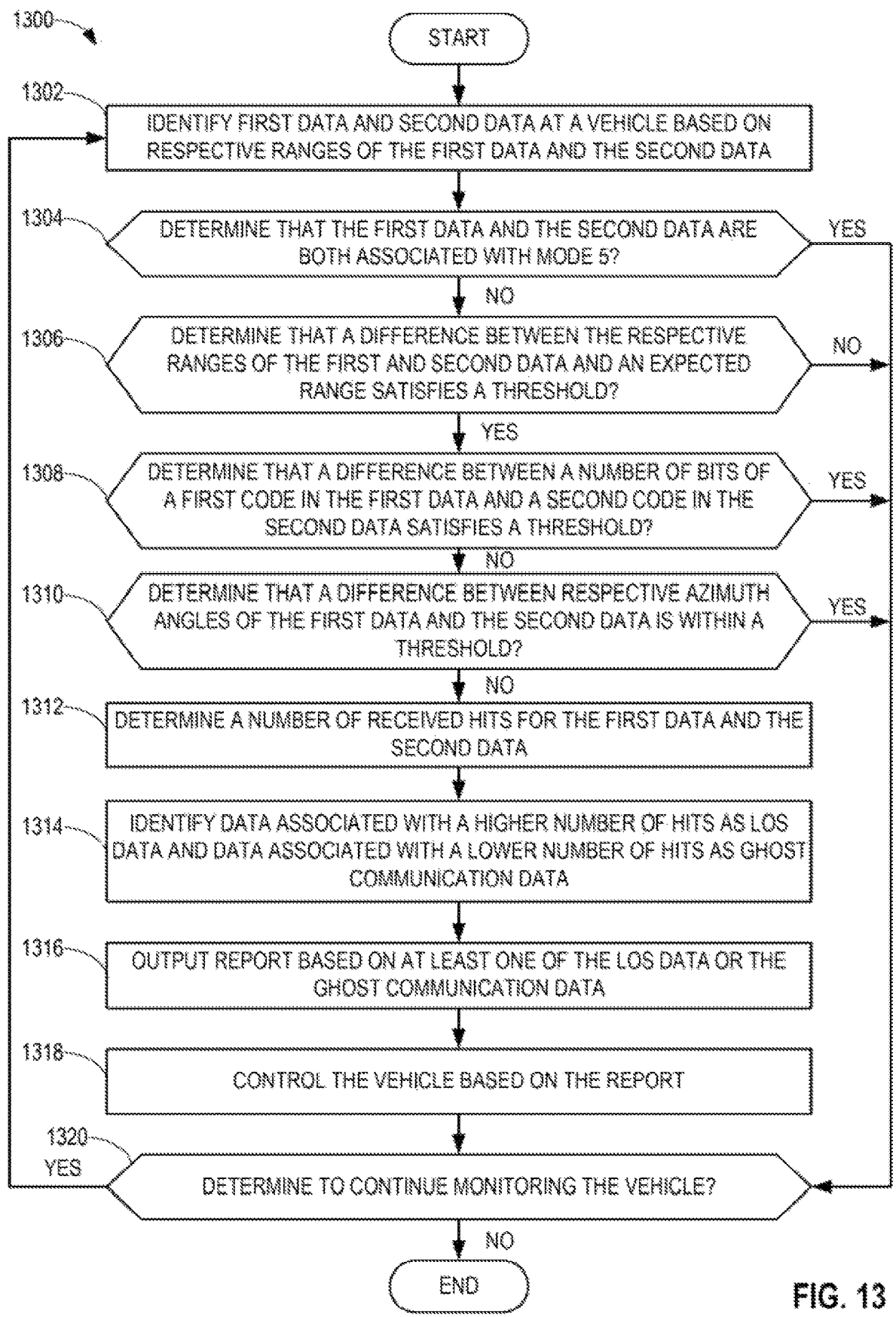
FIG. 13 is a flowchart representative of example machine-readable instructions and/or example operations that may be executed by example processor circuitry to implement the example code merge circuitry of FIG. 3 to control a vehicle based on a report.

FIG. 13 is a flowchart representative of example machine-readable instructions and/or example operations 1300 that may be executed and/or instantiated by processor circuitry to control a vehicle based on a report. In some examples, the machine-readable instructions and/or the operations 1300 of FIG. 13 may be executed and/or instantiated by processor circuitry to identify ghost communication data, such as candidate ghost communication data 804 of FIG. 8. For example, the code merge circuitry 300 associated with the first aircraft 102 can execute and/or instantiate the machine-readable instructions and/or the operations 1300 of FIG. 13 to determine whether the second response message 124 of FIGS. 1 and/or 2 is a reflection of a portion of the first aircraft 102, such as a vertical stabilizer of the first aircraft 102.

The example machine-readable instructions and/or the example operations 1300 of FIG. 13 begin at block 1302, at which the code merge circuitry 300 of FIG. 3 identifies first data and second data at a vehicle based on respective ranges of the first data and the second data. For example, the code source identification circuitry 330 (FIG. 3) can determine that the first data 404 and the second data 406 of FIG. 4 are received at the first radio 110 of the first aircraft 102. In some examples, the code source identification circuitry 330 can determine that the first data 404 is LOS data based on a first range associated with the first data 404 and the second data 406 is multipath data based on a second range associated with the second data 406.

At block 1304, the code merge circuitry 300 determines whether the first data and the second data are both associated with Mode 5. For example, the code identification circuitry 340 can determine that neither of the first data 404 or the second data 406 include Mode 5 data.

If, at block 1304, the code merge circuitry 300 determines that the first data and the second data are both associated with Mode 5, control proceeds to block 1320. Otherwise, control proceeds to block 1306. For example, control can proceed to block 1306 after a determination that the first data 404 includes valid Mode 5 data and the second data 406 only includes SIF data (e.g., M1, M2, M3/A, MC, etc., data or codes).

At block 1306, the code merge circuitry 300 determines whether a difference between the respective ranges of the first and second data and an expected range satisfies a threshold. For example, the parameter determination circuitry 320 (FIG. 3) can determine that a difference between the first range and the second range is within a threshold (e.g., a threshold deviation, difference, etc.) of an expected or predetermined range associated with the first aircraft 102.

If, at block 1306, the code merge circuitry 300 determines that a difference between the respective ranges of the first and second data and an expected range does not satisfy a threshold (e.g., the difference is greater than the threshold), control proceeds to block 1320. Otherwise, control proceeds to block 1308. For example, control can proceed to block 1308 after a determination that the first data 404 and the second data 406 may be from the same data source. In some examples, the code source identification circuitry 330 can determine that the first data 404 and the second data 406 are from the same data source based on a determination that the second data 406 is ghost data or multipath data as disclosed herein.

At block 1308, the code merge circuitry 300 determines whether a difference between a number of bits of a first code in the first data and a second code in the second data satisfies a threshold. For example, the code identification circuitry 340 can determine whether the M1 code in the first data 404 and the M1 code in the second data 406 are different by a specified number of data bits, such as two data bits. In some examples, the code identification circuitry 340 can determine that the M1 code in the first data 404 and the M1 code in the second data 406 are different by one data bit; determine that the one data bit is less than a threshold of two data bits; and determine that the M1 code in the first data 404 and the M1 code in the second data 406 have a high likelihood of corresponding to the same M1 code based on the one data bit difference being less than the threshold of two data bits (and thereby does not satisfy the threshold of two data bits).

If, at block 1308, the code merge circuitry 300 determines that a difference between a number of bits of a first code in the first data and a second code in the second data satisfies a threshold, control proceeds to block 1320. Otherwise, control proceeds to block 1310.

At block 1310, the code merge circuitry 300 determines whether a difference between respective azimuth angles of the first data and the second data is within a threshold. For example, the parameter determination circuitry 320 can determine that a first azimuth angle associated with the first radio 110 when the first data 404 is received and a second azimuth angle associated with the first radio 110 when the second data 406 is received is greater than a threshold difference. In some examples, the parameter determination circuitry 320 can determine that the second data 406 may be ghost communication data based on the difference being greater than the threshold. In some examples, the parameter determination circuitry 320 can determine that the second data 406 may be multipath data based on the difference being less than the threshold.

If, at block 1310, the code merge circuitry 300 determines that a difference between respective azimuth angles of the first data and the second data is within a threshold, control proceeds to block 1320. Otherwise, control proceeds to block 1312.

At block 1312, the code merge circuitry 300 determines a number of received hits for the first data and the second data. For example, the code identification circuitry 340 can evaluate the data integrity of the first data 404 and the second data 406 based on determining a number of hits for one(s) of the data codes of the first data 404 and the second data 406.

At block 1314, the code merge circuitry 300, identifies data associated with a higher number of hits as LOS data and data associated with a lower number of hits as ghost communication data. For example, the code source identification circuitry 330 can determine that the first data 404 has a greater number of hits than the second data 406. In some examples, the code source identification circuitry 330 can determine that the first data 404 has greater data integrity than the second data 406 and thereby can determine that the first data 404 has a relatively high likelihood of being LOS data and the second data 406 has a relatively high likelihood of being ghost communication data, such as ghost communication data.

At block 1316, the code merge circuitry 300 outputs a report based on at least one of the LOS data or the ghost communication data. For example, the report generation circuitry 350 (FIG. 3) can generate one of the reports 376 (FIG. 3) based on the first data 404 after a determination that the first data 404 has a relatively high likelihood of being LOS data. In some examples, the report generation circuitry 350 can generate the one of the reports 376 by merging portion(s) of the second data 406 with the first data 404. For example, the report generation circuitry 350 can merge the first data 404 and the second data 406 after a determination that the first data 404 is missing code(s) that may be included in the second data 406.

At block 1318, the code merge circuitry 300 controls the vehicle based on the report. For example, the vehicle control circuitry 360 (FIG. 3) can cause the first aircraft 102 to be controlled based on the one of the reports 376. In some examples, the vehicle control circuitry 360 can cause the first aircraft 102 to be controlled based on a command to change an altitude, an air speed, a bearing, etc., of the first aircraft 102.

At block 1320, the code merge circuitry 300 determines whether to continue monitoring the vehicle. For example, the interface circuitry 310 (FIG. 3) can determine whether to continue monitoring the first radio 110, and/or, more generally, the first aircraft 102, for received IFF response messages.

If, at block 1320, the code merge circuitry 300 determines to continue monitoring the vehicle, control returns to block 1302. Otherwise, the example machine-readable instructions and/or the example operations 1300 of FIG. 13 conclude.

Figure 14:
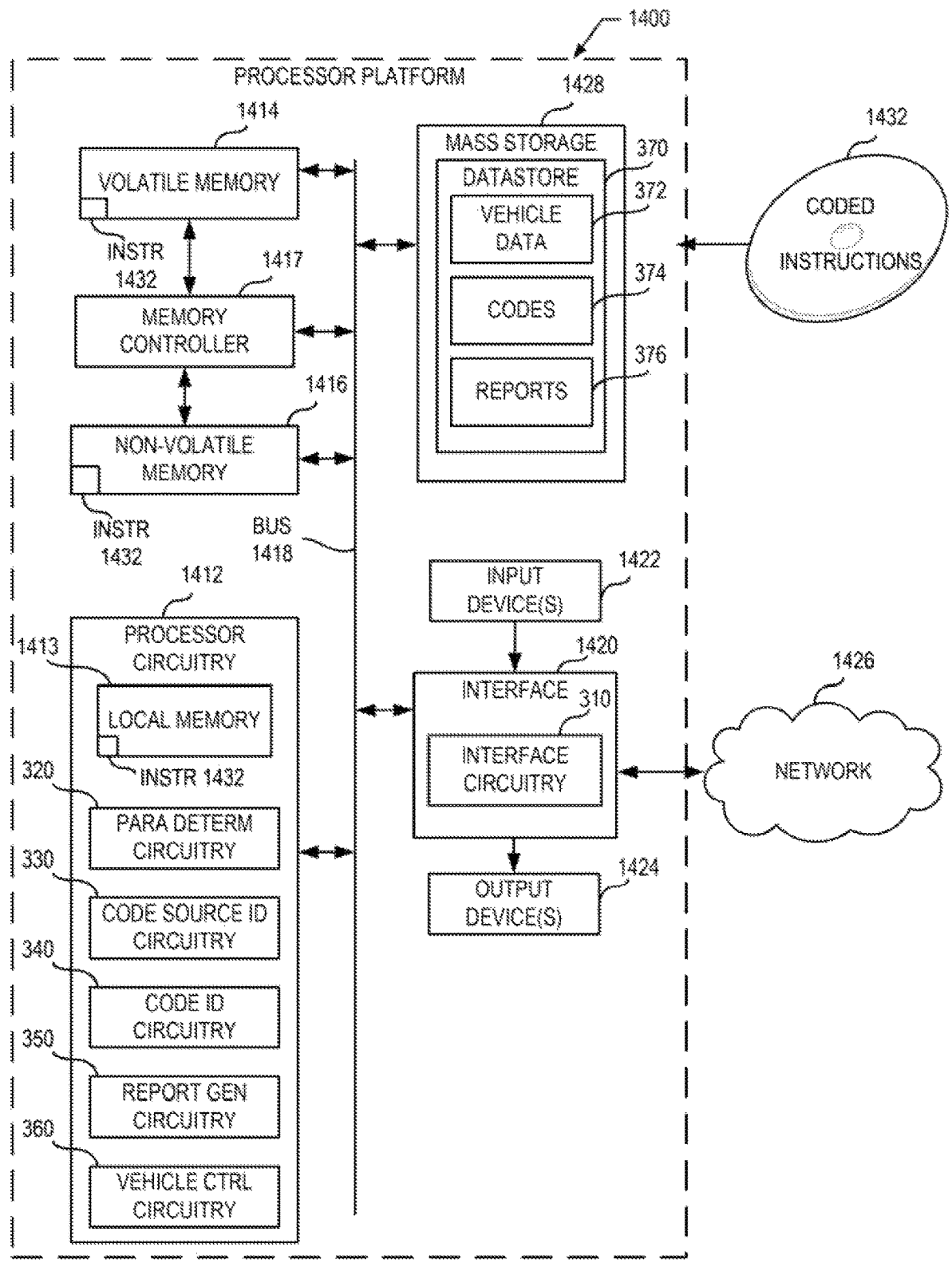
FIG. 14 is a block diagram of an example processing platform including processor circuitry structured to execute the example machine-readable instructions and/or the example operations of FIGS. 9-13 to implement the example code merge circuitry of FIG. 3.

FIG. 14 is a block diagram of an example processor platform 1400 structured to execute and/or instantiate the example machine-readable instructions and/or the example operations of FIGS. 9-13 to implement the code merge circuitry 300 of FIG. 3. In some examples, the processor platform 1400 can be included in the first aircraft 102. In some examples, the processor platform 1400 can be included in the second aircraft 104. In some examples, the processor platform 1400 can be included in the terrestrial communication station 106. In some examples, the processor platform 1400 can be included in the marine vehicle 108.

The processor platform 1400 can be, for example, a server, a personal computer, a workstation, a self-learning machine (e.g., a neural network), a FCC, a line replaceable unit (LRU), an REU, a radio communication station or terminal, or any other type of electronic or computing device. The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs, microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the parameter determination circuitry 320 (identified by PARA DETERM CIRCUITRY), the code source identification circuitry 330 (identified by CODE SOURCE ID CIRCUITRY), the code identification circuitry 340 (identified by CODE ID CIRCUITRY), the report generation circuitry 350 (identified by REPORT GEN CIRCUITRY), and the vehicle control circuitry 360 (identified by VEHICLE CTRL CIRCUITRY) of FIG. 3.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. In some examples, the bus 1418 can implement the bus 380 of FIG. 3. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuitry 1420 implements the interface circuitry 310 of FIG. 3.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, a heads-up display, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a radio, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-sight wireless system, a cellular telephone system, an optical connection, etc. For example, the interface circuitry 1420 can implement the first radio 110, the second radio 112, the third radio 114, and/or the fourth radio 116 of FIGS. 1 and/or 2.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 1428 implement the datastore 370 of FIG. 3, which includes the vehicle data 372, the codes 374, and the reports 376 of FIG. 3.

The machine-readable instructions 1432, which may be implemented by the machine-readable instructions of FIGS. 9-13, may be stored in the mass storage device 1428, in the volatile memory 1414, in the non-volatile memory 1416, and/or on a removable non-transitory computer-readable storage medium such as a CD or DVD.

Figure 15:
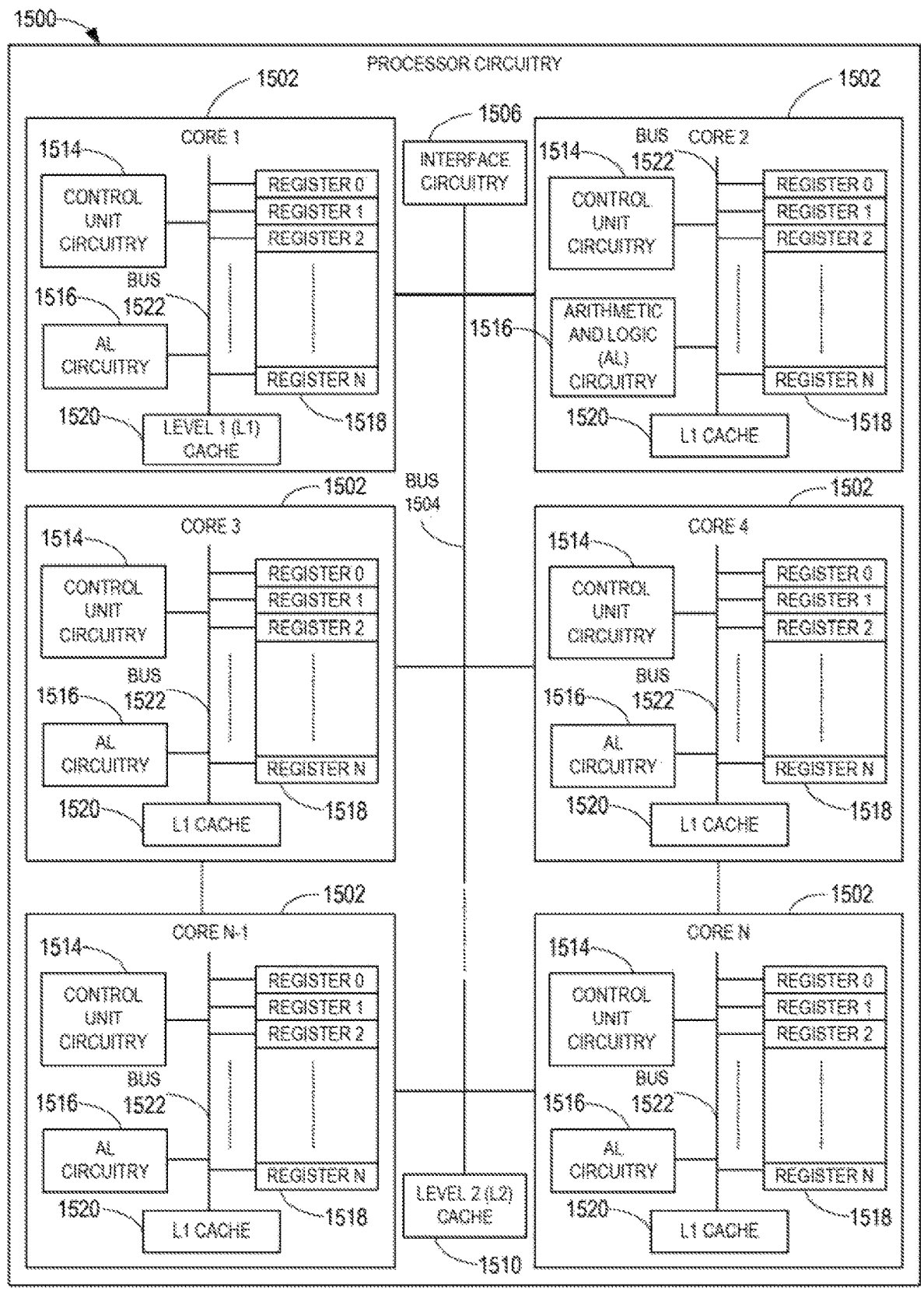
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a microprocessor 1500. For example, the microprocessor 1500 may be a general purpose microprocessor (e.g., general purpose microprocessor circuitry). The microprocessor 1500 executes some or all of the machine-readable instructions of the flowchart of FIG. to effectively instantiate the circuitry of FIG. 2 [er diagram] as logic circuits to perform the operations corresponding to those machine-readable instructions. In some such examples, the circuitry of FIG. 2 [er diagram] is instantiated by the hardware circuits of the microprocessor 1500 in combination with the instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine-readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine-readable instructions and/or operations represented by the flowchart of FIG. _.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Additionally or alternatively, the first bus 1504 may be implemented by any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may be implemented by at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
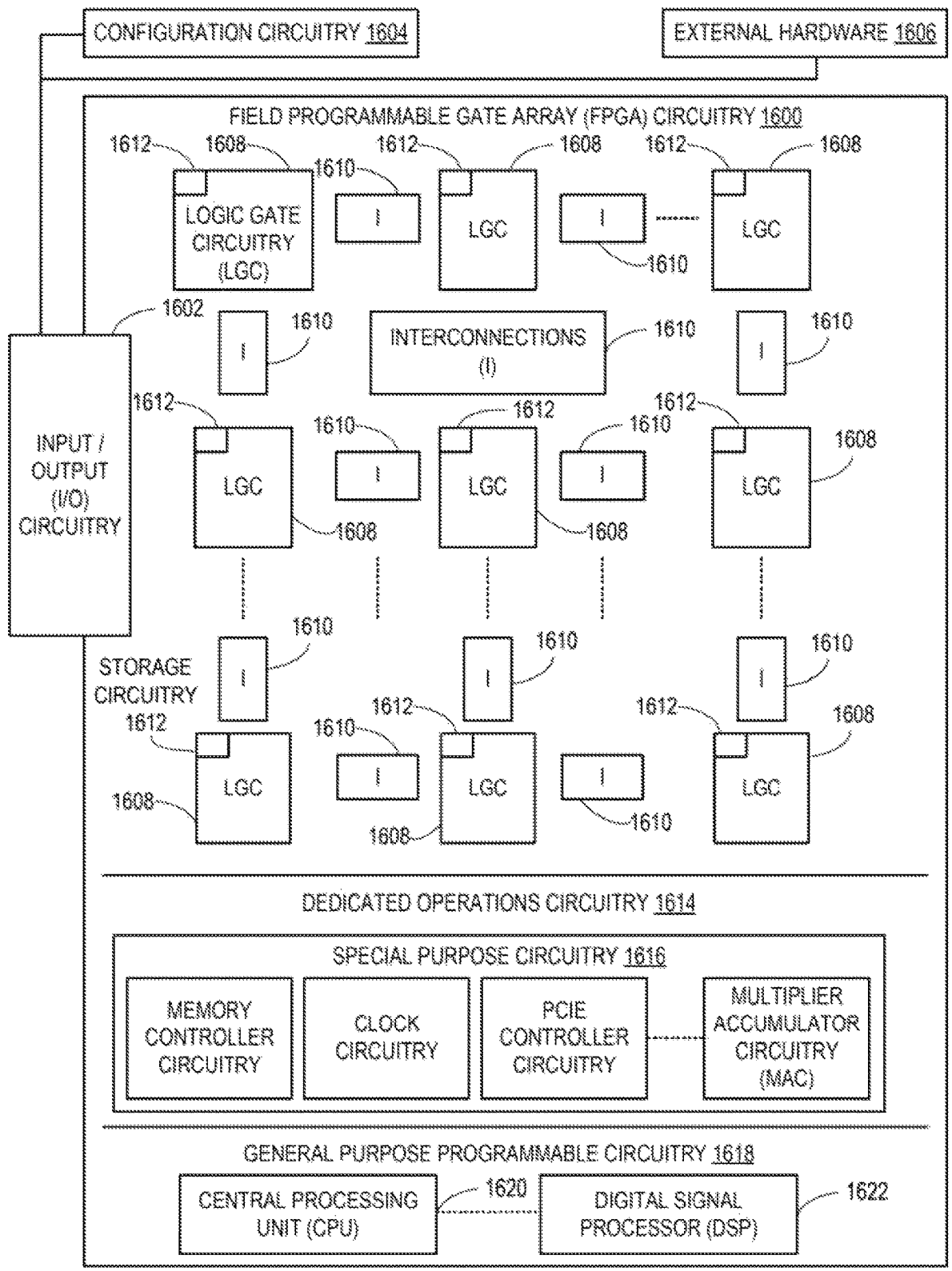
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine-readable instructions. However, once configured, the FPGA circuitry 1600 instantiates the machine-readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine-readable instructions represented by the flowcharts of FIGS. 9-13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine-readable instructions represented by the flowcharts of FIGS. 9-13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 9-13. As such, the FPGA circuitry 1600 may be structured to effectively instantiate some or all of the machine-readable instructions of the flowcharts of FIGS. 9-13 as dedicated logic circuits to perform the operations corresponding to those software instructions in a dedicated manner analogous to an ASIC. Therefore, the FPGA circuitry 1600 may perform the operations corresponding to the some or all of the machine-readable instructions of FIGS. 9-13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain machine-readable instructions to configure the FPGA circuitry 1600, or portion(s) thereof. In some such examples, the configuration circuitry 1604 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may be implemented by external hardware circuitry. For example, the external hardware 1606 may be implemented by the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations that may correspond to at least some of the machine-readable instructions of FIGS. 9-13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine-readable instructions represented by the flowcharts of FIGS. 9-13 may be executed by one or more of the cores 1502 of FIG. 15, a second portion of the machine-readable instructions represented by the flowcharts of FIGS. 9-13 may be executed by the FPGA circuitry 1600 of FIG. 16, and/or a third portion of the machine-readable instructions represented by the flowcharts of FIGS. 9-13 may be executed by an ASIC. It should be understood that some or all of the code merge circuitry 300 of FIG. 3 may, thus, be instantiated at the same or different times. Some or all of the circuitry may be instantiated, for example, in one or more threads executing concurrently and/or in series. Moreover, in some examples, some or all of the code merge circuitry 300 of FIG. 3 may be implemented within one or more virtual machines and/or containers executing on the microprocessor.

In some examples, the processor circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Figure 17:
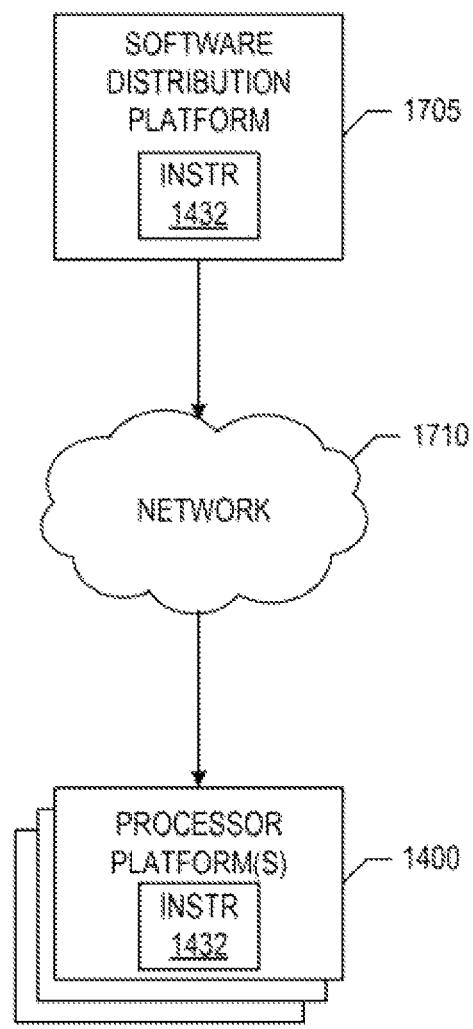
FIG. 17 is a block diagram of an example software distribution platform (e.g., one or more servers) to distribute software (e.g., software corresponding to the example machine-readable instructions of FIGS. 9-13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine-readable instructions 1432 of FIG. 14 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine-readable instructions 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine-readable instructions 1432, which may correspond to the example machine-readable instructions 900, 1000, 1100, 1200, 1300 of FIGS. 9-13, as described above. The one or more servers of the example software distribution platform 1705 are in communication with an example network 1710, which may correspond to any one or more of the Internet and/or any of the example networks 1426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 1432 from the software distribution platform 1705. For example, the software, which may correspond to the example machine-readable instructions 900, 1000, 1100, 1200, 1300 of FIGS. 9-13, may be downloaded to the example processor platform 1400, which is to execute the machine-readable instructions 1432 to implement the code merge circuitry 300 of FIG. 3. In some examples, one or more servers of the software distribution platform 1705 periodically offer, transmit, and/or force updates to the software (e.g., the example machine-readable instructions 1432 of FIG. 14) to ensure improvements, patches, updates, etc., are distributed and applied to the software at the end user devices.

From the foregoing, it will be appreciated that example systems, apparatus, articles of manufacture, and methods have been disclosed for code merging in communication systems. Disclosed systems, apparatus, articles of manufacture, and methods leverage data included in previously unconsidered multipath reports for inclusion in nominal LOS reports, which can offer more complete target entity identification. Disclosed systems, apparatus, articles of manufacture, and methods improve the efficiency of using a computing or electronic device by identifying missing data from typically trusted data sources and identifying the missing data from typically unused data sources to output complete and/or otherwise enhanced communication data. Disclosed systems, apparatus, articles of manufacture, and methods are accordingly directed to one or more improvement(s) in the operation of a machine such as a computer or other electronic and/or mechanical device.

Example systems, apparatus, articles of manufacture, and methods for code merging in communication systems are disclosed herein. Further examples and combinations thereof include the following:

Example 1 includes an apparatus comprising at least one memory, machine-readable instructions, and processor circuitry to at least one of instantiate or execute the machine-readable instructions to at least identify first data as line-of-sight data based on a first range of a first target object, identify second data as multipath data based on a second range of a second target object, after a determination that the second data includes a data portion not included in the first data, output communication data based on a merge of the first data and the second data, and cause movement of at least one of the first target object or the second target object based on the communication data.

Example 2 includes the apparatus of example 1, further including an antenna, and the processor circuitry is to obtain one or more outputs from the antenna, the one or more outputs corresponding to at least one of the first data or the second data.

Example 3 includes the apparatus of example 1, wherein the processor circuitry is to determine that at least one of the first target object or the second target object is an aerial vehicle, a land vehicle, or a marine vehicle.

Example 4 includes the apparatus of example 1, wherein the apparatus is associated with at least one of an aerial vehicle, a land vehicle, a marine vehicle, or a terrestrial communication station.

Example 5 includes the apparatus of example 1, wherein the processor circuitry is to identify the first data as line-of-sight data and the second data as multipath data based on an identification friend or foe technique.

Example 6 includes the apparatus of example 1, wherein the determination is a first determination, and the processor circuitry is to determine the first range of the first target object based on the first data, determine the second range of the second target object based on the second data, and after a second determination that a difference between the first range and the second range satisfies a threshold, determine that the first target object and the second target object are the same target object.

Example 7 includes the apparatus of example 1, wherein the first data includes a first data code, the data portion is a second data code, and the processor circuitry is to merge the first data and the second data based on an inclusion of the first data code and the second data code in the communication data.

Example 8 includes the apparatus of example 1, wherein the first data includes a first data code, the first data is to include a second data code, the data portion is the second data code, and the processor circuitry is to merge the first data and the second data based on an inclusion of the first data code from the first data and the second data code from the second data in the communication data.

Example 9 includes the apparatus of example 1, wherein the movement includes a change of at least one of an altitude, a bearing, or a speed of the at least one of the first target object or the second target object, and the processor circuitry is to generate a control command based on the communication data, the control command to cause the movement of the at least one of the first target object or the second target object.

Example 10 includes the apparatus of example 1, wherein the determination is a first determination, and the processor circuitry is to determine that the first data is associated with a first communication mode, determine that the second data is associated with a second communication mode, and after a second determination that the first communication mode and the second communication mode are different, merge the first data and the second data.

Example 11 includes the apparatus of example 1, wherein the determination is a first determination, and the processor circuitry is to, after a second determination that a difference between the first range and the second range satisfies a threshold, merge the first data and the second data.

Example 12 includes the apparatus of example 1, wherein the first data includes a first code based on first data bits, the second data includes a second code based on second data bits, the second code to correspond to the first code, the determination is a first determination, and the processor circuitry is to, after a second determination that a number of differences between the first data bits and the second data bits does not satisfy a threshold, merge the first data and the second data.

Example 13 includes the apparatus of example 1, wherein the first data is representative of a first code with first data bits, the second data is representative of a second code with second data bits, the determination is a first determination, and the processor circuitry is to identify the second data as ghost communication data based on a second determination that a first difference between the first range and the second range satisfies a first threshold, a third determination that a number of differences between the first data bits and the second data bits do not satisfy a third threshold, the first code to correspond to the second code, a fourth determination that a second difference of a first azimuth angle associated with the first data and a second azimuth angle associated with the second data does not satisfy a second threshold, and merge the first data and the second data based on an identification of the second data as the ghost communication data.

Example 14 includes a non-transitory machine-readable storage medium comprising instructions that, when executed, cause processor circuitry to at least identify first data as line-of-sight data based on a first range of a first target object, identify second data as multipath data based on a second range of a second target object, after a determination that the second data includes a data portion not included in the first data, generate communication data based on a combination of the first data and the second data, and cause movement of at least one of the first target object or the second target object based on the communication data.

Example 15 includes the non-transitory machine-readable storage medium of example 14, wherein the instructions cause the processor circuitry to obtain one or more outputs from an antenna, the one or more outputs corresponding to at least one of the first data or the second data.

Example 16 includes the non-transitory machine-readable storage medium of example 14, wherein the instructions cause the processor circuitry to determine that at least one of the first target object or the second target object is an aerial vehicle, a land vehicle, or a marine vehicle.

Example 17 includes the non-transitory machine-readable storage medium of example 14, wherein the non-transitory machine-readable storage medium is associated with at least one of an aerial vehicle, a land vehicle, a marine vehicle, or a terrestrial communication station.

Example 18 includes the non-transitory machine-readable storage medium of example 14, wherein the instructions cause the processor circuitry is to identify the first data as line-of-sight data and the second data as multipath data based on an identification friend or foe technique.

Example 19 includes the non-transitory machine-readable storage medium of example 14, wherein the determination is a first determination, and the instructions cause the processor circuitry to determine the first range of the first target object based on the first data, determine the second range of the second target object based on the second data, and after a second determination that a difference between the first range and the second range satisfies a threshold, determine that the first target object and the second target object are the same target object.

Example 20 includes the non-transitory machine-readable storage medium of example 14, wherein the first data includes a first data code, the data portion is a second data code, and the instructions cause the processor circuitry to combine the first data and the second data based on an inclusion of the first data code and the second data code in the communication data.

Example 21 includes the non-transitory machine-readable storage medium of example 14, wherein the first data includes a first data code, the first data is to include a second data code, the data portion is the second data code, and the instructions cause the processor circuitry to combine the first data and the second data based on an inclusion of the first data code from the first data and the second data code from the second data in the communication data.

Example 22 includes the non-transitory machine-readable storage medium of example 14, wherein the movement includes a change of at least one of an altitude, a bearing, or a speed of the at least one of the first target object or the second target object, and the instructions cause the processor circuitry to generate a control command based on the communication data, the control command to cause the movement of the at least one of the first target object or the second target object.

Example 23 includes the non-transitory machine-readable storage medium of example 14, wherein the determination is a first determination, and the instructions cause the processor circuitry to determine that the first data is associated with a first communication mode, determine that the second data is associated with a second communication mode, and after a second determination that the first communication mode and the second communication mode are different, combine the first data and the second data.

Example 24 includes the non-transitory machine-readable storage medium of example 14, wherein the determination is a first determination, and the instructions cause the processor circuitry to, after a second determination that a difference between the first range and the second range satisfies a threshold, combine the first data and the second data.

Example 25 includes the non-transitory machine-readable storage medium of example 14, wherein the first data includes a first code based on first data bits, the second data includes a second code based on second data bits, the second code to correspond to the first code, the determination is a first determination, and the instructions cause the processor circuitry to, after a second determination that a number of differences between the first data bits and the second data bits does not satisfy a threshold, combine the first data and the second data.

Example 26 includes the non-transitory machine-readable storage medium of example 14, wherein the first data is representative of a first code with first data bits, the second data is representative of a second code with second data bits, the determination is a first determination, and the instructions cause the processor circuitry to identify the second data as ghost communication data based on a second determination that a first difference between the first range and the second range satisfies a first threshold, a third determination that a number of differences between the first data bits and the second data bits do not satisfy a third threshold, the first code to correspond to the second code, a fourth determination that a second difference of a first azimuth angle associated with the first data and a second azimuth angle associated with the second data does not satisfy a second threshold, and combine the first data and the second data based on an identification of the second data as the ghost communication data.

Example 27 includes a method comprising identifying first data as line-of-sight data based on a first range of a first target object, identifying second data as multipath data based on a second range of a second target object, after a determination that the second data includes a data portion not included in the first data, outputting communication data based on a merge of the first data and the second data, and causing movement of at least one of the first target object or the second target object based on the communication data.

Example 28 includes the method of example 27, further including obtaining one or more outputs from an antenna, the one or more outputs corresponding to at least one of the first data or the second data.

Example 29 includes the method of example 27, further including determining that at least one of the first target object or the second target object is an aerial vehicle, a land vehicle, or a marine vehicle.

Example 30 includes the method of example 27, further including identifying the first data as line-of-sight data and the second data as multipath data based on an identification friend or foe technique.

Example 31 includes the method of example 27, wherein the determination is a first determination, and the method further including determining the first range of the first target object based on the first data, determining the second range of the second target object based on the second data, and after a second determination that a difference between the first range and the second range satisfies a threshold, determining that the first target object and the second target object are the same target object.

Example 32 includes the method of example 27, wherein the first data includes a first data code, the data portion is a second data code, and the method further including merging the first data and the second data based on an inclusion of the first data code and the second data code in the communication data.

Example 33 includes the method of example 27, wherein the first data includes a first data code, the first data is to include a second data code, the data portion is the second data code, and the method further including merging the first data and the second data based on an inclusion of the first data code from the first data and the second data code from the second data in the communication data.

Example 34 includes the method of example 27, wherein the movement includes a change of at least one of an altitude, a bearing, or a speed of the at least one of the first target object or the second target object, and the method further including outputting a control command based on the communication data, the control command to cause the movement of the at least one of the first target object or the second target object.

Example 35 includes the method of example 27, wherein the determination is a first determination, and the method further including determining that the first data is associated with a first communication mode, determining that the second data is associated with a second communication mode, and after a second determination that the first communication mode and the second communication mode are different, merging the first data and the second data.

Example 36 includes the method of example 27, wherein the determination is a first determination, and the method further including, after a second determination that a difference between the first range and the second range satisfies a threshold, merging the first data and the second data.

Example 37 includes the method of example 27, wherein the first data includes a first code based on first data bits, the second data includes a second code based on second data bits, the second code to correspond to the first code, the determination is a first determination, and the method further including, after a second determination that a number of differences between the first data bits and the second data bits does not satisfy a threshold, merging the first data and the second data.

Example 38 includes the method of example 27, wherein the first data is representative of a first code with first data bits, the second data is representative of a second code with second data bits, the determination is a first determination, and the method further including identifying the second data as ghost communication data based on a second determination that a first difference between the first range and the second range satisfies a first threshold, a third determination that a number of differences between the first data bits and the second data bits do not satisfy a third threshold, the first code to correspond to the second code, a fourth determination that a second difference of a first azimuth angle associated with the first data and a second azimuth angle associated with the second data does not satisfy a second threshold, and merging the first data and the second data based on an identification of the second data as the ghost communication data.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   at least one memory;
   machine-readable instructions; and
   processor circuitry to at least one of instantiate or execute the machine-readable instructions to at least:
     identify first data as line-of-sight data based on a first range of a first target object;
     identify second data as multipath data based on a second range of a second target object;
     after a determination that the second data includes a data portion not included in the first data, output communication data based on a merge of the first data and the second data; and
     cause movement of at least one of the first target object or the second target object based on the communication data.

2. The apparatus of claim 1, further including an antenna, and the processor circuitry is to obtain one or more outputs from the antenna, the one or more outputs corresponding to at least one of the first data or the second data.

3. The apparatus of claim 1, wherein the processor circuitry is to determine that at least one of the first target object or the second target object is an aerial vehicle, a land vehicle, or a marine vehicle.

4. The apparatus of claim 1, wherein the apparatus is associated with at least one of an aerial vehicle, a land vehicle, a marine vehicle, or a terrestrial communication station.

5. The apparatus of claim 1, wherein the processor circuitry is to identify the first data as line-of-sight data and the second data as multipath data based on an identification friend or foe technique.

6. The apparatus of claim 1, wherein the determination is a first determination, and the processor circuitry is to:
determine the first range of the first target object based on the first data;
determine the second range of the second target object based on the second data; and
after a second determination that a difference between the first range and the second range satisfies a threshold, determine that the first target object and the second target object are the same target object.

7. The apparatus of claim 1, wherein the first data includes a first data code, the data portion is a second data code, and the processor circuitry is to merge the first data and the second data based on an inclusion of the first data code and the second data code in the communication data.

8. The apparatus of claim 1, wherein the first data includes a first data code, the first data is to include a second data code, the data portion is the second data code, and the processor circuitry is to merge the first data and the second data based on an inclusion of the first data code from the first data and the second data code from the second data in the communication data.

9. The apparatus of claim 1, wherein the movement includes a change of at least one of an altitude, a bearing, or a speed of the at least one of the first target object or the second target object, and the processor circuitry is to generate a control command based on the communication data, the control command to cause the movement of the at least one of the first target object or the second target object.

10. The apparatus of claim 1, wherein the determination is a first determination, and the processor circuitry is to:
determine that the first data is associated with a first communication mode;
determine that the second data is associated with a second communication mode; and
after a second determination that the first communication mode and the second communication mode are different, merge the first data and the second data.

11. The apparatus of claim 1, wherein the determination is a first determination, and the processor circuitry is to, after a second determination that a difference between the first range and the second range satisfies a threshold, merge the first data and the second data.

12. The apparatus of claim 1, wherein the first data includes a first code based on first data bits, the second data includes a second code based on second data bits, the second code to correspond to the first code, the determination is a first determination, and the processor circuitry is to, after a second determination that a number of differences between the first data bits and the second data bits does not satisfy a threshold, merge the first data and the second data.

13. The apparatus of claim 1, wherein the first data is representative of a first code with first data bits, the second data is representative of a second code with second data bits, the determination is a first determination, and the processor circuitry is to:
identify the second data as ghost communication data based on:
a second determination that a first difference between the first range and the second range satisfies a first threshold;
a third determination that a number of differences between the first data bits and the second data bits do not satisfy a third threshold, the first code to correspond to the second code;
a fourth determination that a second difference of a first azimuth angle associated with the first data and a second azimuth angle associated with the second data does not satisfy a second threshold; and
merge the first data and the second data based on an identification of the second data as the ghost communication data.

14. A non-transitory machine-readable storage medium comprising instructions that, when executed, cause processor circuitry to at least:
identify first data as line-of-sight data based on a first range of a first target object;
identify second data as multipath data based on a second range of a second target object;
after a determination that the second data includes a data portion not included in the first data, generate communication data based on a combination of the first data and the second data; and
cause movement of at least one of the first target object or the second target object based on the communication data.

15. The non-transitory machine-readable storage medium of claim 14, wherein the determination is a first determination, and the instructions cause the processor circuitry to:
determine the first range of the first target object based on the first data;
determine the second range of the second target object based on the second data; and
after a second determination that a difference between the first range and the second range satisfies a threshold, determine that the first target object and the second target object are the same target object.

16. The non-transitory machine-readable storage medium of claim 14, wherein the movement includes a change of at least one of an altitude, a bearing, or a speed of the at least one of the first target object or the second target object, and the instructions cause the processor circuitry to generate a control command based on the communication data, the control command to cause the movement of the at least one of the first target object or the second target object.

17. The non-transitory machine-readable storage medium of claim 14, wherein the first data is representative of a first code with first data bits, the second data is representative of a second code with second data bits, the determination is a first determination, and the instructions cause the processor circuitry to:
identify the second data as ghost communication data based on:
a second determination that a first difference between the first range and the second range satisfies a first threshold;
a third determination that a number of differences between the first data bits and the second data bits do not satisfy a third threshold, the first code to correspond to the second code;
a fourth determination that a second difference of a first azimuth angle associated with the first data and a second azimuth angle associated with the second data does not satisfy a second threshold; and
combine the first data and the second data based on an identification of the second data as the ghost communication data.

18. A method comprising:
identifying first data as line-of-sight data based on a first range of a first target object;
identifying second data as multipath data based on a second range of a second target object;
after a determination that the second data includes a data portion not included in the first data, outputting communication data based on a merge of the first data and the second data; and
causing movement of at least one of the first target object or the second target object based on the communication data.

19. The method of claim 18, wherein the determination is a first determination, and the method further including, after a second determination that a difference between the first range and the second range satisfies a threshold, merging the first data and the second data.

20. The method of claim 18, wherein the first data includes a first code based on first data bits, the second data includes a second code based on second data bits, the second code to correspond to the first code, the determination is a first determination, and the method further including, after a second determination that a number of differences between the first data bits and the second data bits does not satisfy a threshold, merging the first data and the second data.

\* \* \* \* \*